(12) United States Patent
Smith

(10) Patent No.: US 12,151,831 B2
(45) Date of Patent: Nov. 26, 2024

(54) FABRICATION OF CURVED COMPOSITE PREFORMS FOR AIRCRAFT VIA ASSEMBLY LINES

(71) Applicant: The Boeing Company, Chicago, IL (US)

(72) Inventor: Daniel R. Smith, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 337 days.

(21) Appl. No.: 17/454,290

(22) Filed: Nov. 10, 2021

(65) Prior Publication Data

US 2022/0153446 A1   May 19, 2022

Related U.S. Application Data

(60) Provisional application No. 63/115,048, filed on Nov. 18, 2020.

(51) Int. Cl.
| | |
|---|---|
| *B64F 5/10* | (2017.01) |
| *B29C 70/30* | (2006.01) |
| *B64C 1/06* | (2006.01) |
| *B64F 5/50* | (2017.01) |
| *B29L 31/30* | (2006.01) |
| *B64C 1/00* | (2006.01) |

(52) U.S. Cl.
CPC .............. *B64F 5/10* (2017.01); *B29C 70/304* (2021.05); *B64C 1/061* (2013.01); *B64F 5/50* (2017.01); *B29L 2031/3082* (2013.01); *B64C 2001/0072* (2013.01)

(58) Field of Classification Search
CPC . B64F 5/10; B64F 5/50; B29C 70/304; B29C 31/08; B29C 70/38; B29C 70/34; B29C 31/004; B64C 1/061; B64C 2001/0072; B29L 2031/3082; B29L 2031/3076; B29B 11/16
See application file for complete search history.

(56) References Cited

U.S. PATENT DOCUMENTS

| | | | |
|---|---|---|---|
| 9,731,899 B1 * | 8/2017 | Cardon | B32B 5/02 |
| 9,764,499 B2 | 9/2017 | Jones et al. | |
| 2012/0269999 A1 | 10/2012 | Kind et al. | |
| 2014/0065354 A1 | 3/2014 | Smith, Jr. et al. | |
| 2021/0260837 A1 * | 8/2021 | Weiler | B29C 70/34 |

OTHER PUBLICATIONS

European Patent Office Extended Search Report, dated Mar. 16, 2022, regarding Application No. EP21207546.9, 10 pages.
Netherlands Patent Office Written Opinion and Search Report with English Translation, dated Jul. 15, 2021, regarding Application No. NL2027437, 13 pages.

* cited by examiner

*Primary Examiner* — Jun S Yoo
(74) *Attorney, Agent, or Firm* — Yee & Associates, P.C.

(57) ABSTRACT

Systems and methods are provided for fabricating curved preforms of fiber reinforced material. Methods include laying up at least one ply onto a carrier of flexible material at a lamination station, loading the carrier onto a rail system, routing the carrier to a particular Ply-By-Ply (PBP) forming station at the rail system, separating the at least one ply from the carrier, and making the at least one ply into the preform via the particular PBP forming station.

24 Claims, 21 Drawing Sheets

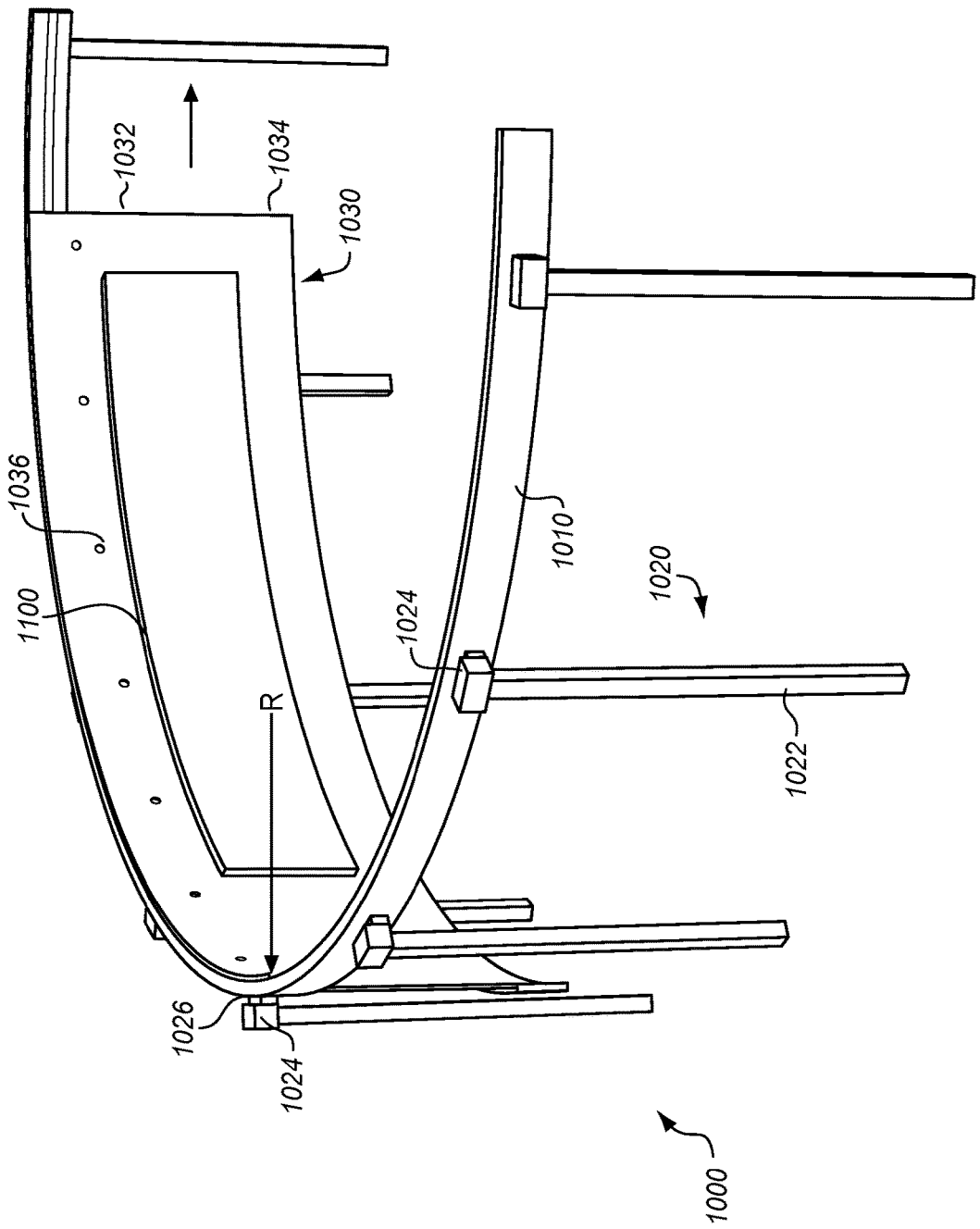

FABRICATION OF CURVED COMPOSITE PREFORMS FOR AIRCRAFT VIA ASSEMBLY LINES

CROSS-REFERENCE TO RELATED APPLICATION

This application claims the benefit of U.S. Provisional Patent Application Ser. No. 63/115,048, filed Nov. 18, 2020, and entitled "Fabrication of Curved Composite Preforms for Aircraft via Assembly Lines;" which is incorporated herein by reference in its entirety.

FIELD

The disclosure relates to the field of fabrication, and in particular, to fabrication of aircraft.

BACKGROUND

The mechanical structure of an aircraft is referred to as an airframe. An airframe is made from discrete components such as stringers, spars, skins, and frames which, when assembled together, define a shape of the aircraft. An individual aircraft may be fabricated from many such components, all or some of which may be fabricated as composite parts. For example, an aircraft may utilize a large number of curved or contoured frames to reinforce its fuselage. Ideally, the frames are fabricated at a rate sufficient to meet with a desired assembly timing for a desired production rate for the aircraft, otherwise the fabrication of the aircraft may be undesirably delayed.

Therefore, it would be desirable to have a method and apparatus that take into account at least some of the issues discussed above, as well as other possible issues.

SUMMARY

Embodiments described herein provide assembly lines for rapidly fabricating curved composite parts (e.g., frames) for aircraft via the use of assembly lines. The assembly lines include track systems that dynamically deliver individual plies to a variety of Ply-By-Ply (PBP) forming stations that are clustered together. By dynamically delivering plies for forming to multiple PBP forming stations in a Just-in-Time (JIT) manner, a greater work density can be achieved. That is, curved composite parts can be fabricated rapidly via a unique arrangement of stations that occupies less space on the factory floor than used by conventional assembly techniques. In one embodiment disclosed is a method for fabricating a curved preform of fiber reinforced material including laying up at least one ply onto a carrier of flexible material at a lamination station, loading the carrier onto a rail system, routing the carrier to a particular Ply-By-Ply (PBP) forming station at the rail system based on a characteristic of the at least one ply carried by the carrier, separating the at least one ply from the carrier, and making the at least one ply into the preform via the particular PBP forming station.

In a further embodiment, disclosed is a system that for fabricating curved preforms of fiber reinforced material including a lamination station that lays up plies for curved preforms onto carriers of flexible material, a rail system that routes the carriers from the lamination station to PBP forming stations, and that forms a loop between the lamination station and the PBP forming stations, and Ply-By-Ply (PBP) forming stations that receive the plies, and that form the plies into the curved preforms. In a further embodiment, there is a system for fabricating curved preforms of fiber reinforced material, the system comprising a lamination station that lays up plies for curved preforms onto carriers of flexible material, a rail system that routes the carriers from the lamination station to PBP forming stations, and that forms a loop between the lamination station and the PBP forming stations, and Ply-By-Ply (PBP) forming stations that receive the plies, and that form the plies into the curved preforms.

In a further embodiment, disclosed is a system including a rail system including tracks that form concentric circles, including an inner concentric circle that is adjacent to multiple Ply-By-Ply (PBP) forming stations, and an outer concentric circle that is adjacent to a lamination station, tracks that form spurs that couple the concentric circles together; and supports that hold the tracks in an elevated position, and carriers that transport plies across the rail system from the lamination station to the PBP forming stations.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 11 depicts a carrier transporting a ply for application to a PBP forming station in an illustrative embodiment.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure and are to be construed as being without limitation to such specifically recited examples and conditions. As a result, the disclosure is not limited to the specific embodiments or examples described below, but by the claims and their equivalents.

Composite parts, such as Carbon Fiber Reinforced Polymer (CFRP) parts, are initially laid-up in multiple layers that together are referred to as a preform. Individual fibers within each layer of the preform are aligned parallel with each other, but different layers exhibit different fiber orientations in order to increase the strength of the resulting composite part along different dimensions. The preform includes a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber is infused with resin prior to hardening. For thermoset resins, the hardening is a one-way process referred to as curing, while for thermoplastic resins, the resin reaches a viscous form if it is re-heated, after which it can be consolidated to a desired shape and solidified. As used herein, the umbrella term for the process of transitioning a preform into a final hardened shape (i.e., transitioning a preform into a composite part) is referred to as "hardening," and this term encompasses both the curing of thermoset preforms and the forming/solidifying of thermoplastic preforms into a final desired shape.

Figure 1:
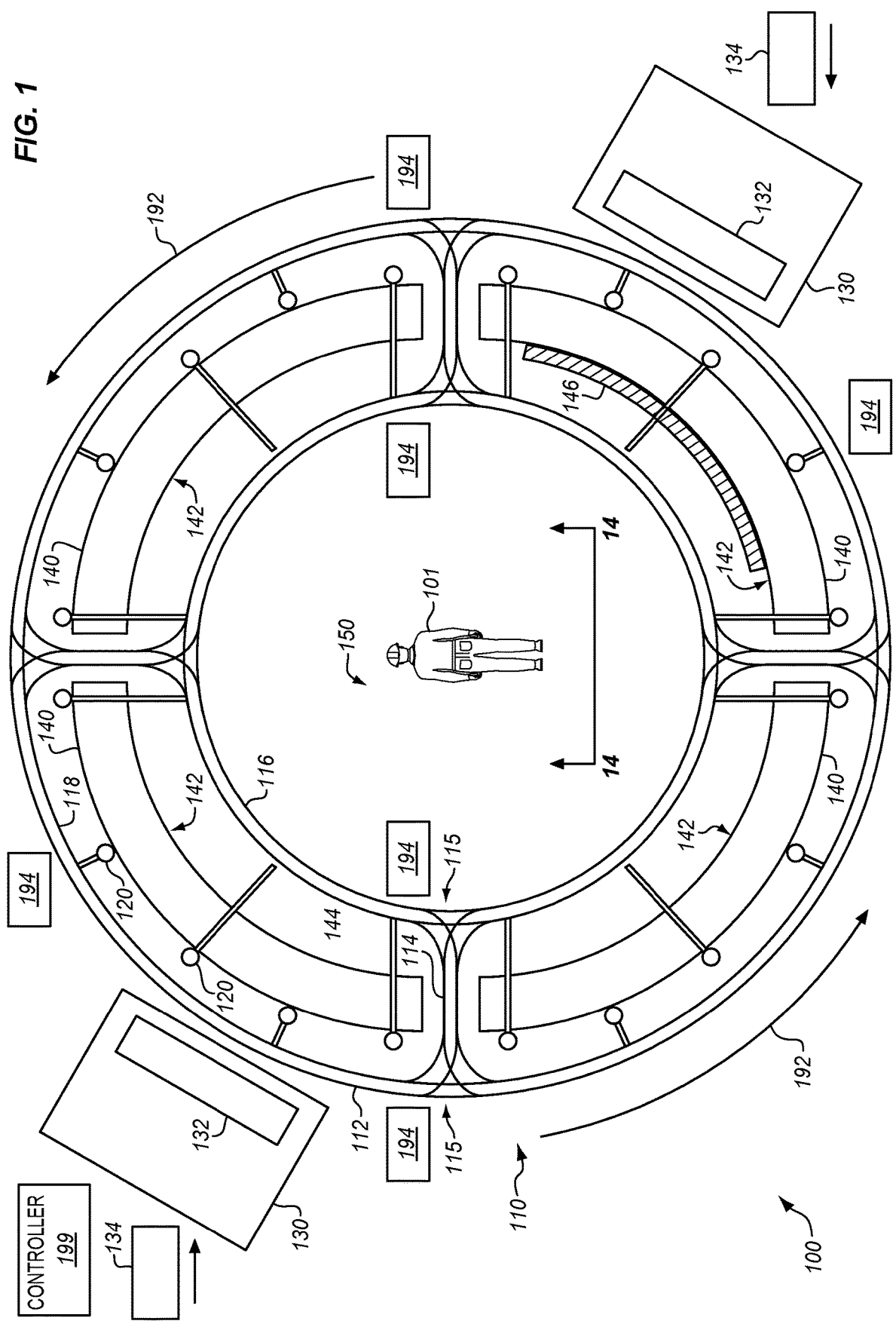
FIG. 1 illustrates a fabrication system for curved preforms of fiber reinforced material in an illustrative embodiment.

FIG. 1 illustrates a fabrication system 100 for curved preforms of fiber reinforced material in an illustrative embodiment. Lamination stations 130 lay up one or more plies 220 onto carriers 210 of flexible material (discussed below with regard to FIGS. 2-6). Fabrication system 100 includes multiple Ply-By-Ply (PBP) forming stations 140. Each PBP forming station 140 fabricates curved preforms 146 by iteratively shaping individual plies delivered on carriers 210 of flexible material 211 into conformance with a mandrel 142 (e.g., a contoured mandrel). In one embodiment, PBP forming stations 140 comprise forming stations which apply clamping force along an arc, such as those described in U.S. Pat. No. 9,314,974. In further embodiments, the PBP forming stations 140 form complex shapes by draping plies over corners of a mandrel 142 before shaping the plies 220.

FIG. 1 illustrates that the PBP forming stations 140 are arranged in a curved pattern 144 (e.g., an arc or circle), and are accessible via a rail system 110. Rail system 110 includes tracks 118, which are contoured and form one or more loops (e.g., inner concentric circle 116, outer concentric circle 112) between the lamination stations 130 and the PBP forming stations 140. In further embodiments, other means of accessibility, such as automated vehicles and tracks, are utilized. The inner concentric circle 116 is adjacent to multiple Ply-By-Ply (PBP) forming stations 140, and the outer concentric circle 112 is adjacent to at least one lamination station. Thus, the tracks 118 couple the lamination stations 130 to the PBP forming stations 140. In a further embodiment, routing the carriers 210 comprises advancing the carriers 210 through one or more loops (e.g., inner concentric circle 116, outer concentric circle 112) formed by the rail system 110 between the lamination stations 130 and the PBP forming stations 140.

The concentric circles are coupled via spurs 114, which comprise junctions 115 at the outer concentric circle 112 and the inner concentric circle 116. That is, the tracks 118 form the spurs 114 that couple the outer concentric circle 112 and inner concentric circle 116 together. The spurs 114 include portions of track 118 disposed between the outer concentric circle 112 and the inner concentric circle 116. The track 118 is elevated and is held in place by supports 120 (e.g., posts). In this embodiment, the supports 120 are positioned between the outer concentric circle 112 and the inner concentric circle 116. This arrangement permits access to the track 118 of the rail system 110 by a technician 101 operating in a work space 150 inside of the fabrication system 100 (e.g., within the inner concentric circle 116 and hence defined by the rail system 110), and also permits access (e.g., ingress and egress) to the track 118 by a technician 101 disposed outside of the fabrication system 100. That is, a technician 101 within the work space 150 can walk up to materials at the inner concentric circle 116, and a technician 101 outside of the fabrication system 100 can walk up to materials at the outer concentric circle 112. In other embodiments, the supports 120 are positioned in other locations relative to the outer concentric circle 112 and the inner concentric circle 116.

The spurs 114 enable transitions between different portions of track 118 and couple the outer concentric circle 112 and the inner concentric circle 116 together. Hence, backups do not exist at the outer concentric circle 112 as a carrier 210 (e.g., as shown in FIGS. 2-6) can be routed to the inner concentric circle 116. In a similar fashion, if a carrier 210 at the inner concentric circle 116 is currently being loaded onto a PBP forming station 140, an upstream carrier 210 at the outer concentric circle 112 can be routed to a next spur that is downstream of the carrier 210 that is being loaded, in order to arrive at a PBP forming station 140 without waiting. Each of the spurs 114 may therefore be utilized to move materials between the outer concentric circle 112 and the inner concentric circle 116. Movement to the inner concentric circle 116 places the plies 220 (e.g., as shown in FIGS. 2-6) within easy ergonomic reach of a technician 101 within a work space 150 for inspection, or other work and/or movement assistance. In further embodiments, routes between the outer concentric circle 112 and the inner concentric circle 116 and between the lamination stations 130 and the PBP forming stations 140 may go clockwise or counterclockwise. Routes on the outer concentric circle 112 and the inner concentric circle 116 may go clockwise or counterclockwise. The spurs 114 are effectively off ramps from the outer concentric circle 112 and on-ramps to the inner concentric circle 116. In still further embodiments, switching operations at the spurs 114 are controlled based upon received RFID information.

Lamination stations 130 lay up plies 220 onto carriers 210 of flexible material 211 (discussed below with regard to FIGS. 2-6) that are themselves disposed over layup mandrels 132. The carriers 210 are then transported to place the plies 220 onto PBP forming stations 140. While two lamination stations 130 are shown, more or less lamination stations 130 are possible depending on design considerations. Feeder lines 134 supply the fiber reinforced material 221 of FIG. 2 to the lamination stations 130 in a Just in Time (JIT) manner. The carriers 210 advance along the rail system 110 towards the PBP forming stations 140 for application to a mandrel 142 and integration/compaction into a preform 146 for a composite part. In PBP forming processes used by the PBP forming stations 140, a single ply (or small group of plies) 220 is shaped according to a desired contour into a base of a preform 146, then additional plies are added to the preform 146 and shaped until the preform 146 is completed. In yet further embodiments, each lamination station 130 is different. For example, different lamination stations may produce plies 220 of different fiber orientations as desired. Plies 220 laid-up by the lamination stations 130 are arranged into flat pattern, and each flat pattern may be associated with a different identifier provided by a Radio Frequency Identifier (RFID) chip 213 on the carrier 210. In further embodiments, there are additional inner concentric circles which each have a lamination station thereat.

Portions of track 118 can be disposed at different heights/elevations above the shop floor. Therefore, up to four lamination stations 130 could have four rail systems 110 including outer concentric circle 112, spur 114 and the inner concentric circle 116 at four heights/elevations above the shop floor. Each rail system 110 can deliver plies to the PBP forming stations 140 and be tracked along the way using an RFID system. The order of application of the plies 220 from the rail systems 110 is predetermined prior to the plies 220 leaving on carriers 210 from the lamination stations 130.

Depending on the embodiment, each of the lamination stations 130 may lay up plies to supply one or more PBP forming stations 140. In one embodiment, the lamination stations 130 remain stationary while performing layup onto the carriers 210. However, in further embodiments, the lamination stations 130 move along or next to the carriers 210 and/or track 118 (e.g., via actuators or other motorized elements not shown) during layup as desired to form a ply. The lamination stations 130 may lay up plies via automated lamination techniques (e.g., automated taping, laying, or fiber placement), via a combination of a composite cutting machine and pick and place techniques, or via any suitable means onto a carrier (e.g., carrier 210 of FIG. 2) disposed at a layup mandrel 132. Furthermore, lamination stations 130 may perform lamination at a horizontal orientation or vertical orientation as desired, by placing fiber reinforced material 221 onto a horizontal layup surface or a vertical layup surface, respectively. After layup for a preform 146 has been completed, a new layup mandrel (e.g., for another design of preform 146) may replace the current layup mandrel at a lamination station 130. Because the carrier 210 is conformable, it adapts to the geometry of the current layup mandrel.

In one embodiment, the lamination stations 130 dynamically lay up plies (e.g., ply 220 of FIG. 2) for multiple preforms, according to the design of the current preform (e.g., preform 146 of FIG. 1) being shaped by each PBP forming station 140. For example, a first PBP forming station 140 may fabricate a preform 146 by applying plies onto a carrier 210 until the preform 146 is completed for a frame of an aircraft, a second PBP forming station 140 may fabricate a preform for a frame of a different design for an aircraft, and a third PBP forming station 140 may fabricate a preform 146 for a door surround or window surround. Each ply 220 for each preform 146 being fabricated may therefore be shaped differently or exhibit different fiber orientations in order to facilitate the design. Thus, different plies may include different configurations of fiber-reinforced material, placed at different fiber orientations. Phrased another way, the PBP forming stations 140 iteratively shape individual plies into conformance with a mandrel 142.

Even in embodiments where plies 220 are being laid up for PBP forming stations 140 that are fabricating preforms of the same design, the plies 220 used for each layer of those preforms 146 may vary throughout the thickness of the preform 146. Thus, the ply 220 laid-up for one PBP forming station 140 at a first stage of fabrication may be different from a ply 220 laid-up for a PBP forming station 140 at a second stage of fabrication for a preform of the same design. Furthermore, while only one preform 146 is shown in FIG. 1, it will be appreciated that a preform 146 may be fabricated at each of the forming stations 140 at the same time (e.g., resulting in four preforms 146 being formed at the same time at the forming stations of FIG. 1.).

In one embodiment, the lamination stations 130 dynamically determine a ply 220 to lay up, based on a progress of each of the PBP forming stations 140. In further embodiments, the order of plies 220 being laid-up is predetermined. In either case, carriers 210 that carry plies intended for distant PBP forming stations 140 may route through the outer concentric circle 112 in order to advance past carriers 210 that are paused at other PBP forming stations 140. In some embodiments, the carriers 210 are advanced continuously through the rail system 110, while in further embodiments the carriers 210 are "pulsed" in the direction indicated by the arrows 192 of FIG. 1, and may be pulsed clockwise, counterclockwise, or in different directions at each of the concentric circles. The carriers 210 are pulsed by advancing the carriers 210 synchronously and then pausing the carriers 210 synchronously at regular intervals according to a desired takt time. Pulsed motion along arrows 192 may be implemented as a "micro pulse" wherein the carriers 210 are moved by less than their length per movement, or as a "full pulse" wherein the carriers 210 are advanced by at least their entire length per pulse, in either a manual or automated process.

Figure 2:
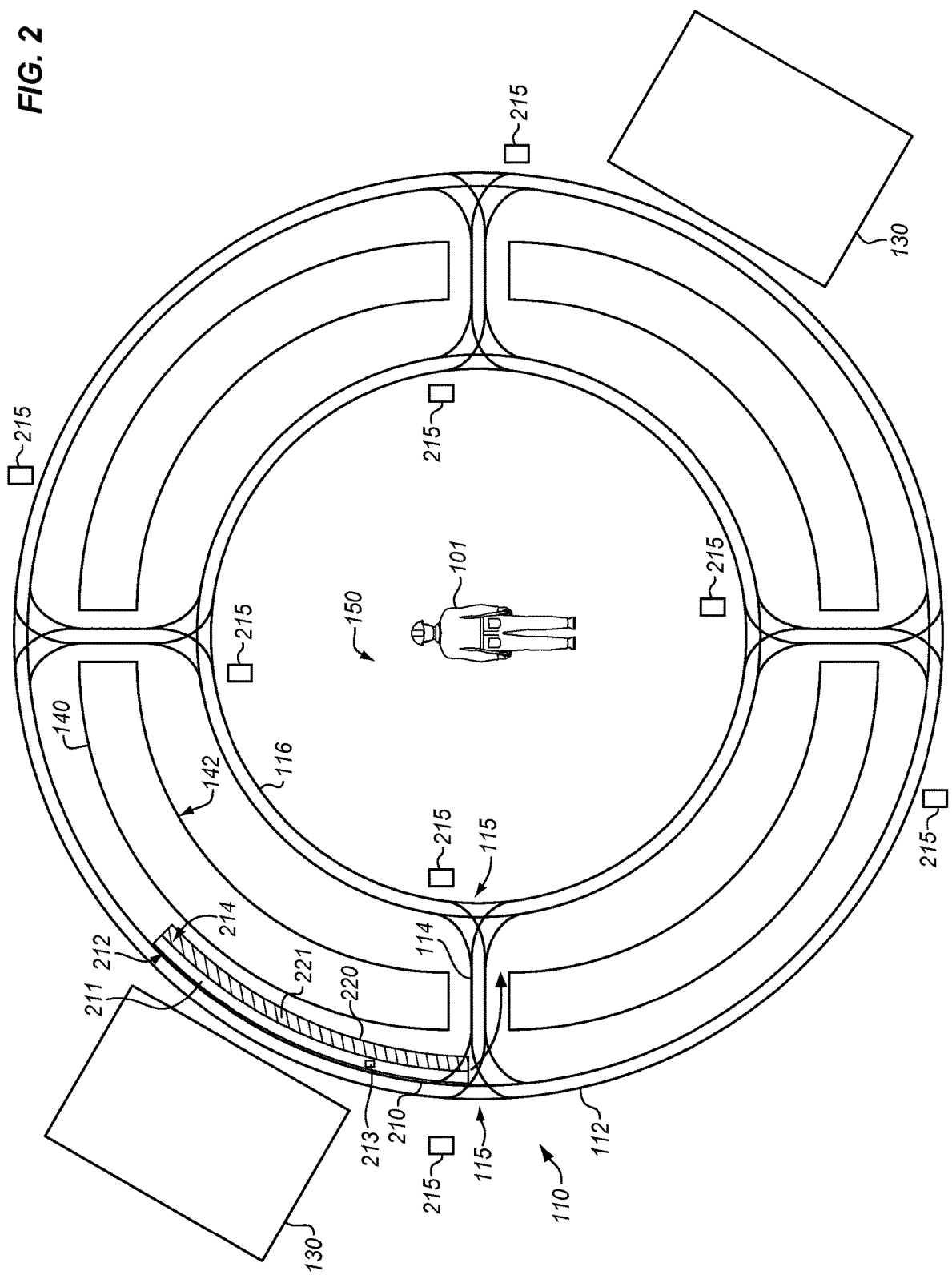
FIGS. 2-6 depict movement of a carrier and ply through the fabrication system of FIG. 1 in an illustrative embodiment.

FIG. 1 further depicts a controller 199, which in this embodiment is coupled for communication with lamination stations 130 and PBP forming stations 140, and/or track 118 and RFID scanners 215 of FIG. 2. In this embodiment, controller 199 coordinates the actions of the depicted devices, as well as movement of carriers 210 along the rail system 110 in a coordinated and synchronous manner, wherein the carriers 210 are prevented from creating traffic jams with respect to other carriers 210 at the rail system 110. This may be performed, for example, by coordinating the actions of the lamination stations 130, PBP forming stations 140, and/or carriers 210 in accordance with one or more Numerical Control (NC) programs. In one embodiment, controller 199 is implemented as custom circuitry, as a hardware processor executing programmed instructions stored in memory, or some combination thereof.

In further embodiments, the fabrication system 100 is utilized for Just In Time (JIT) delivery of preforms 146 for frames or components to a moving line, wherein plies 220 are delivered as they are needed to PBP forming stations 140 without a need to maintain an inventory of the plies 220 at the PBP forming stations 140. Frames are delivered by the fabrication system 100 as they are needed to subsequent fabrication system (such as for assembly of an aircraft fuselage), without a need for the subsequent fabrication system to maintain an inventory of those frames.

Components moving along the line can be pulsed by their length or less than their length, and then paused. Alternatively, the components can be moved continuously. The various elements moved along the rail system 110 can be moved via automated or manual processes in a process direction. In one embodiment, up to four preforms 146 are fabricated at the same time, and progress of each of the preforms 146 is tracked by controller 199 via input from the PBP forming stations 140 and/or the lamination stations 130. Based on received input, the controller 199 determines the order and/or orientation of plies 220 that have applied, as well as the order and/or orientation of plies 220 yet to be applied to each of the PBP forming stations 140.

In further embodiments, carriers 210 include identifiers such as markings, barcodes, or Radio Frequency Identifier (RFID) chips 213, which are used to track plies laid-up thereon, as well as the movement of the carriers 210 from the lamination stations 130 to the PBP forming stations 140 and back. In such embodiments, tracking systems 194 (e.g., laser scanners, optical devices, RFID scanners 215, etc.) detect the progress of the carriers 210 through the rail system 110. In one embodiment, lamination stations 130 and/or PBP forming stations 140 are disposed directly above or below the rail system 110 in order to facilitate attachment/detachment operations. This may also eliminate concerns related to traffic stacking or bagging up. In one embodiment, the rail system 110 progresses the carriers 210 continuously in an elevation above a shop floor.

FIGS. 2-6 depict movement of a carrier 210 and ply 220 through the fabrication system 100 of FIG. 1 in an illustrative embodiment. Assume, for this embodiment, that a lamination station 130 has laid-up a ply 220 onto a carrier 210, which is made from a flexible material, such as a flexible fabric, deformable film that elastically returns to its original shape after deformation, a material discussed in U.S. Pat. No. 8,551,380, a material discussed in U.S. Pat. No. 9,701,067, etc. The ply 220 is tacked or otherwise affixed to the carrier 210, which means that the ply 220 is retained in contact with the carrier 210, and bends with the carrier 210 as the carrier 210 travels along the track 118. That is, bending/flexing of the carrier 210 during movement of the carrier 210 is not the same as the PBP forming processes discussed above, but rather occurs during transport prior to the ply 220 undergoing PBP forming. Newly received carriers 210 may be disengaged from the track 118 prior to presentation to a lamination station 130 or PBP forming station 140.

After layup (e.g., for one to two plies for shaping together onto a preform 146 at a PBP forming station 140) has been completed, the carrier 210, is placed onto a track 118 of the rail system 110 as shown in FIG. 2. The carrier 210 is then advanced through the rail system 110. Because the rail system 110 includes tracks 118 that are curved, the carrier 210 flexibly curves as it follows the tracks 118. The ply 220 at the carrier 210 is originally laid down in a flat pattern that suits the contour of a preform 146. While the ply 220 conforms to the curvature of the track 118 during transport to a PBP forming station 140, the act of transport does not permanently impart a contour to the ply 220.

Figure 3A:
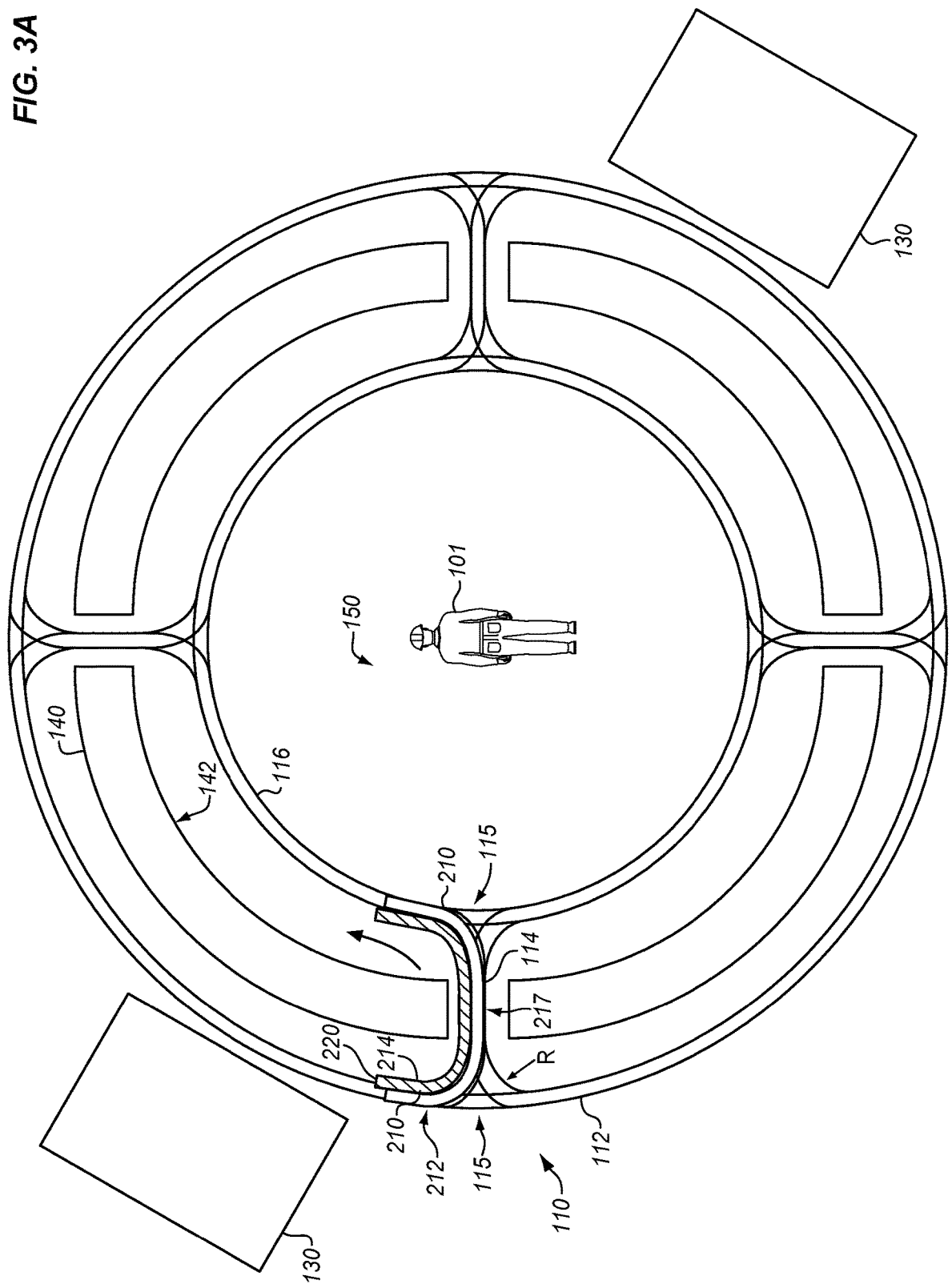

The dynamic changes in shape of the carrier 210 caused by the tracks 118 cause the carrier 210 to exhibit an inner curvature 214 and an outer curvature 212. In this embodiment, the ply 220 occupies the inner curvature 214 of the carrier 210 while the carrier 210 is disposed at the outer concentric circle 112. In FIG. 3A, the carrier 210 switches tracks at a junction 115, and proceeds into the inner concentric circle 116. Because the carrier 210 is flexible, and because the ply 220 remains tacked or otherwise retained by the carrier 210, the ply 220 and the carrier 210 conform to the curvature of the portion of the track 118 that they traverse. For this reason, the track 118 is dimensioned to provide a geometry wherein a radius of curvature is always at least equal to or greater than a predefined amount (e.g., ten inches, two feet, etc.). In one embodiment, the radius of curvature is always directly related to a radius of a finally fabricated preform 146. The track 118 is of a contour or arc such that the ply 220 and the carrier 210 stay adhered (i.e., is not tighter than a threshold radius of curvature) but is also able to support a range of geometries for a lamination station 130. The range of geometries allows for the fabrication of preforms 146 having different radii of curvature. This curvature can ensure that the carrier 210 and ply 220 are not pinched in a manner that would result in the ply 220 separating from the carrier 210 during transport via manual or automated processes.

Figure 3B:
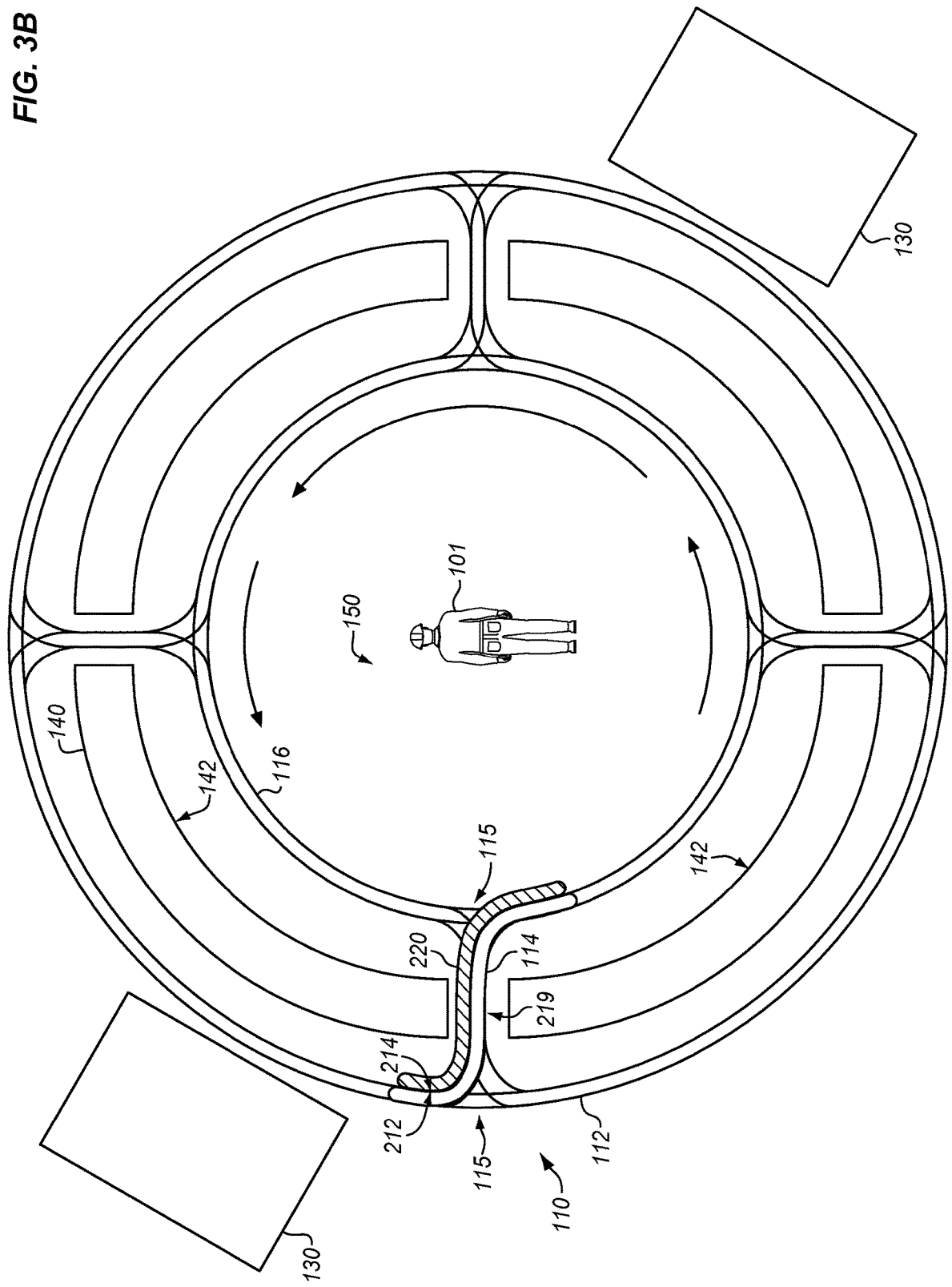

FIG. 3A illustrates that the carrier 210 follows a "U" shape 217 while being transported via manual or automated processes while traversing spur 114. In an embodiment where the carrier 210 hangs vertically from the track 118, the carrier 210 may have its orientation altered from horizontal to vertical (e.g., by rotating the carrier 210). Thus, in such an embodiment, laying up the plies 220 is performed while the carriers 210 are oriented horizontally, and loading the carriers 210 comprises orienting the carriers 210 vertically. The "U" shape 217 is followed as the carrier 210 bends to transition from a rotating outer concentric circle 112 onto an inner concentric circle 116 that counter-rotates via a manual or automated process. This causes the ply 220 to occupy an outer curvature of the carrier 210, which enables the ply 220 to be directly placed into contact with a mandrel 142, thereby applying a first ply for a preform 146, or adding material to a preform 146 already placed thereupon. However, in further embodiments as shown in FIG. 3B, an "S" shape 219 is followed as the carrier 210 bends to transition from the outer concentric circle 112 into the inner concentric circle 116 when both are rotating in the same direction via a manual or automated process. In an embodiment where the carrier 210 hangs vertically from the track 118, the carrier 210 may have its orientation altered from horizontal to vertical (e.g., by rotating the carrier 210). Thus, in such an embodiment, laying up plies 220 is performed while the carriers 210 are oriented horizontally, and loading the carriers 210 comprises orienting the carriers 210 vertically. In this embodiment a rotation or flipping step is required prior to presentation of the ply 220 to the mandrel 142, although in further embodiments the preform 146 is applied to the carrier 210 in a manner such that after following the "S" shape 219, the preform 146 faces the mandrel 142.

Figure 4:
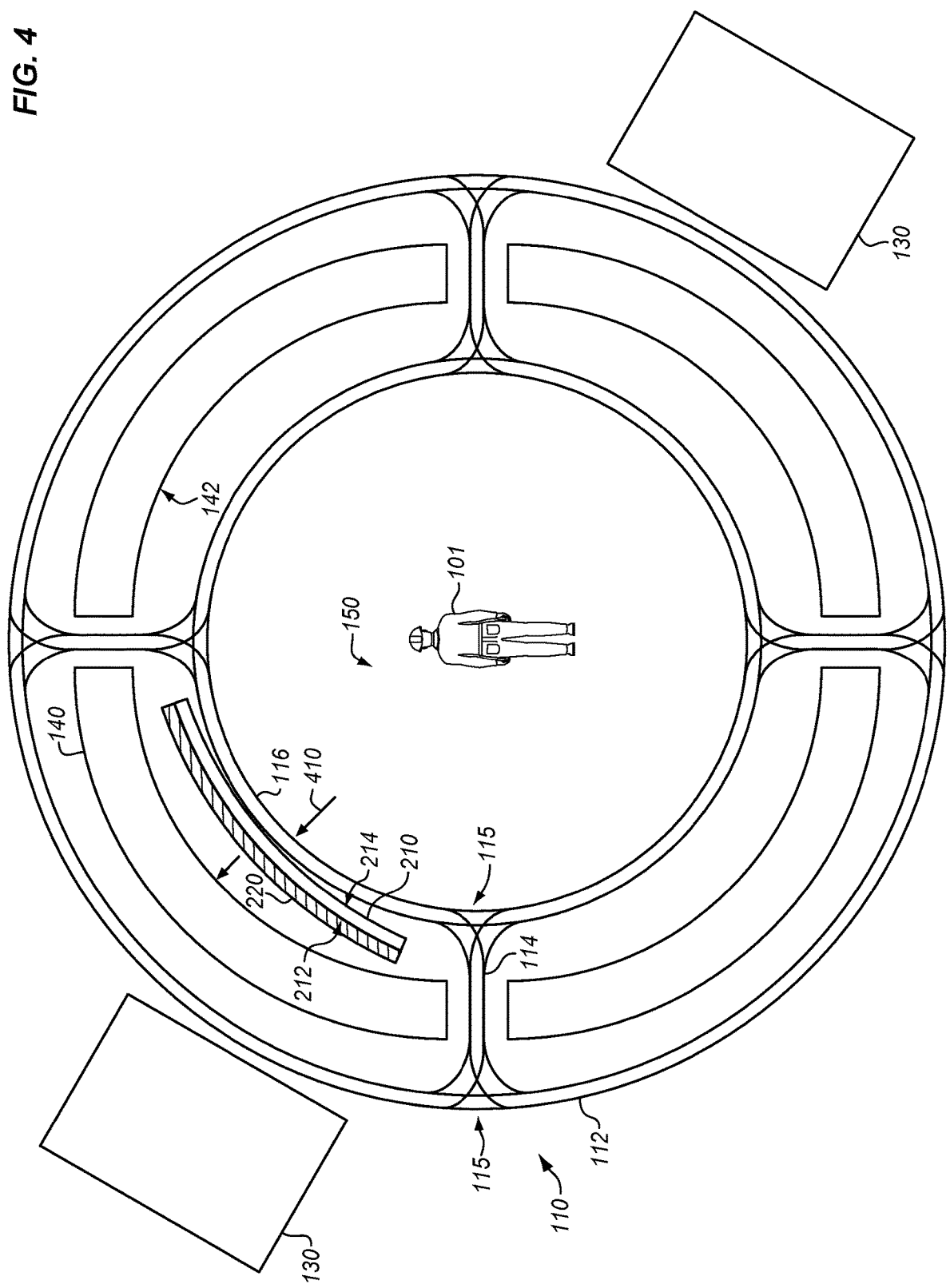

In FIG. 4, the carrier 210 has completed its traversal through the spur 114 via a manual or automated process and has arrived at PBP forming station 140. The portions of track 118 over which the carrier 210 has traveled may be referred to as a first track that leads from the lamination station 130 to location 410 prior to placement at the PBP forming station 140. The ply 220 has not moved relative to the carrier 210, but because of the curvature of track 118, now occupies an outer curvature 212 of the carrier 210, can be directly placed onto the mandrel 142 of the PBP forming station 140.

Figure 5:
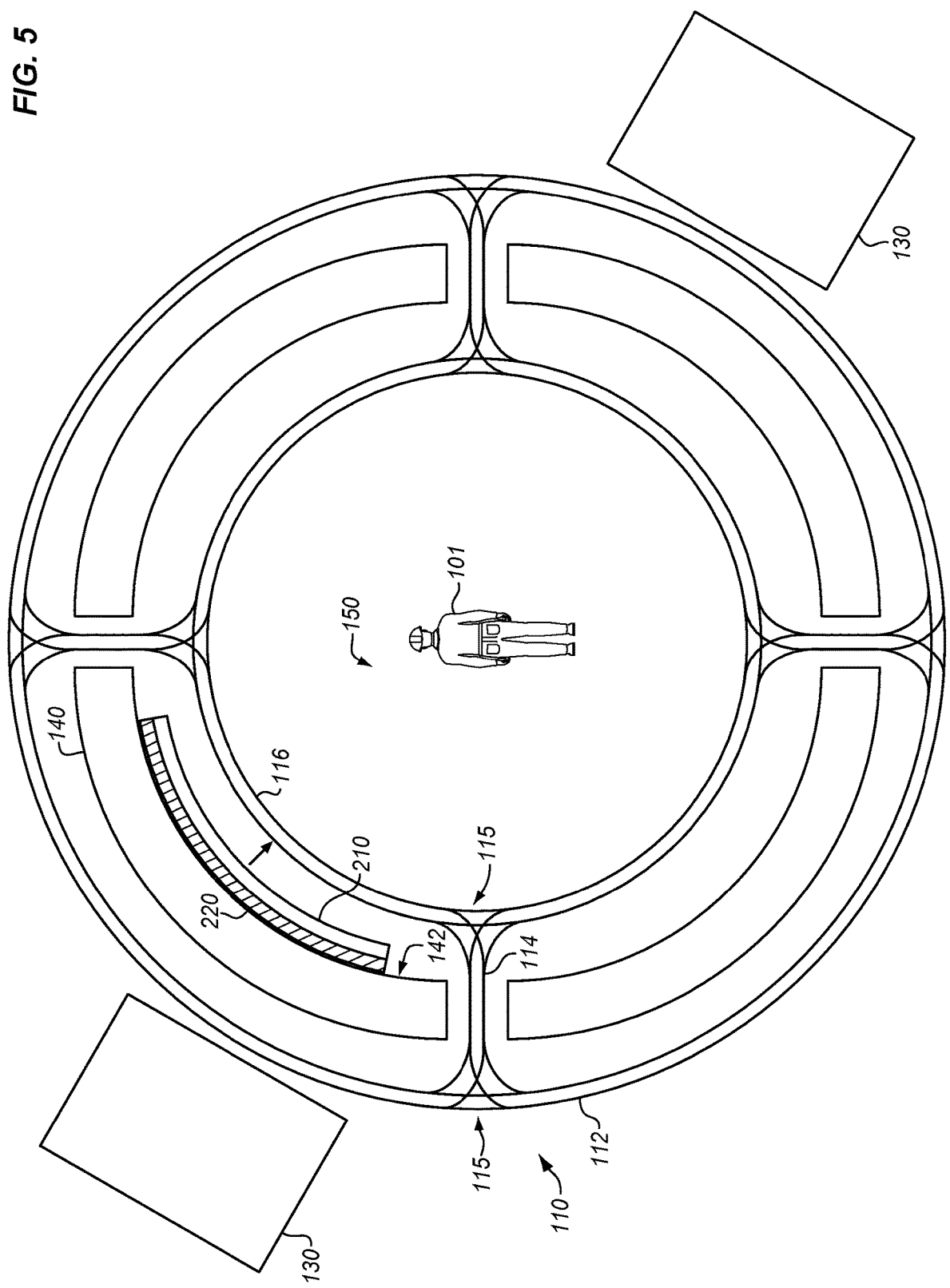
Figure 6:
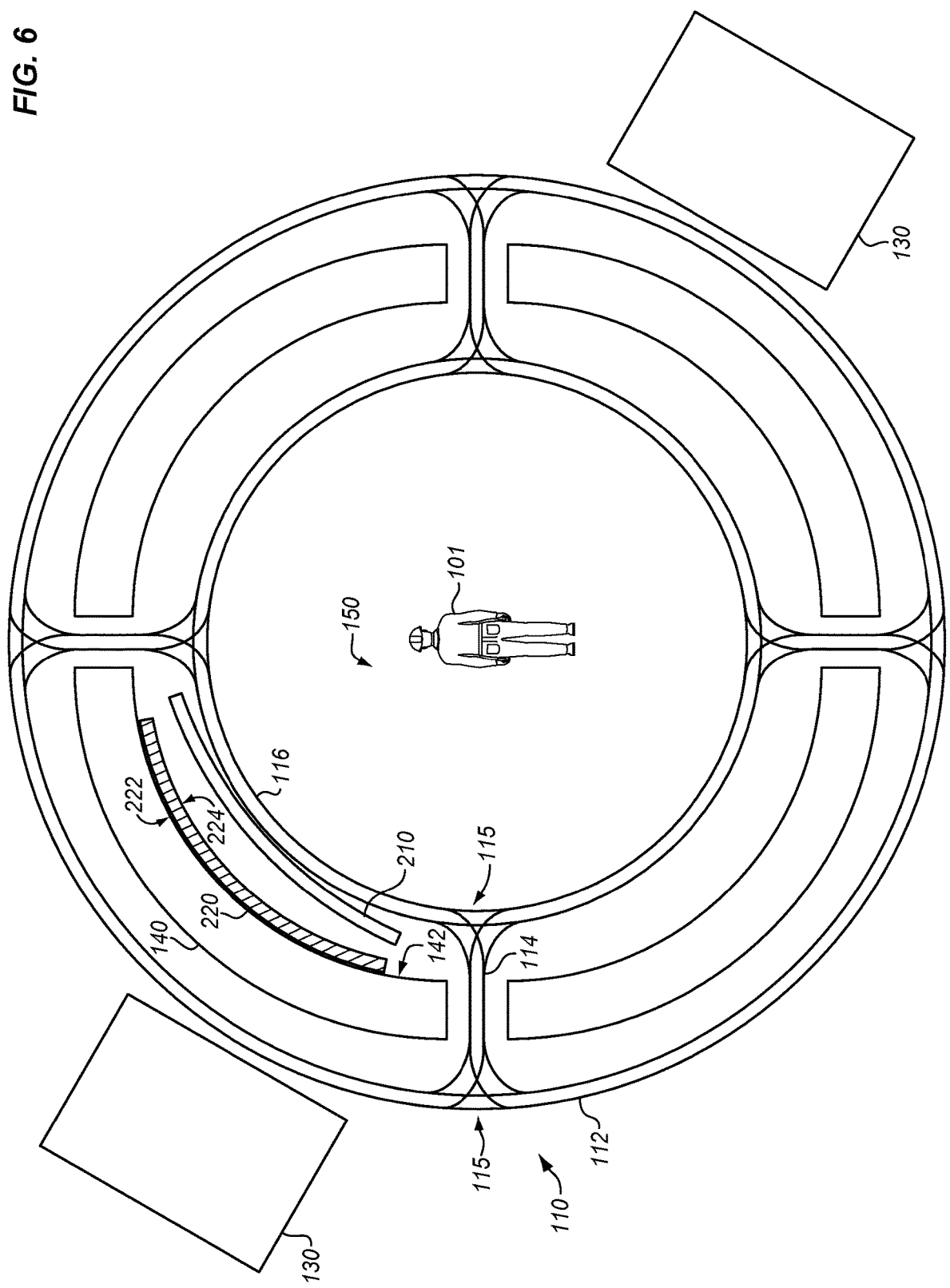

FIG. 5 illustrates the carrier 210 and the ply 220 separated from the rail and pressed into contact with a mandrel 142 and/or preform 146 of the PBP forming station 140 via manual or automated processes. In further embodiments, the PBP forming stations 140 additionally perform draping and/or rotation of the carriers 210 and the plies 220, in order to form the plies 220 to desired complex contours. The carrier 210 is then removed from the ply 220 (e.g., by peeling the carrier 210 away via manual or automated means) and placed back onto the rail system 110 in FIG. 6. The peeling may be performed via a manual or automated process. The ply 220 now exhibits an outer frame portion 222 and an inner frame portion 224. The carrier 210 then proceeds via the rail system 110 (e.g., transitioning via a spur 114 as described above with regard to FIGS. 3A-3B, only in reverse) from the inner concentric circle 116 to the outer concentric circle 112 for cleaning, replacement, or re-use at the lamination station 130. The portions of track 118 over which the carrier 210 has traveled to return for re-use may be referred to as a second track that leads from the PBP forming station 140 to the lamination station 130. The ply 220 is then formed onto a mandrel 142, or onto preform 146 that is already disposed at the mandrel 142.

Figure 7:
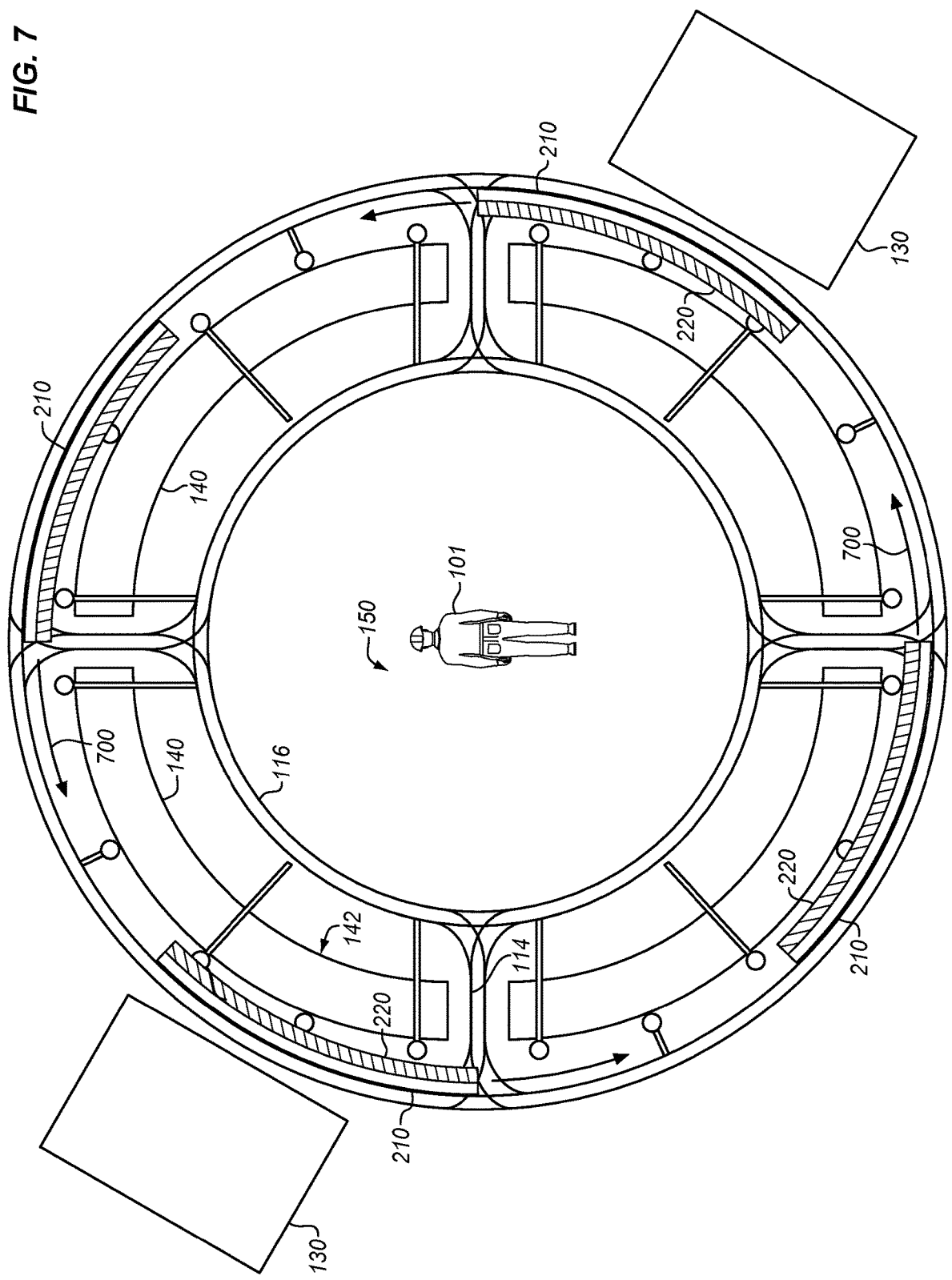
FIG. 7 depicts multiple carriers traversing the fabrication system of FIG. 1 in an illustrative embodiment.

FIG. 7 depicts multiple carriers traversing the fabrication system of FIG. 1 in an illustrative embodiment. As shown in FIG. 7, the rail system 110 supports the use of multiple carriers 210 at once. The carriers 210 may be advanced in the same direction 700 through each of the concentric circles of track 118, in order to ensure a continuous flow of materials without blocking or interference between different carriers. Carriers 210 return to the lamination station 130 along the outer concentric circle 112 for the carrier 210. Thus, layup is placed upon the carrier 210 and the carrier 210 traverses to the inner concentric circle 116 where it is detached and moved into alignment with a PBP forming station 140, the carrier 210 then moves back to the inner concentric circle 116, and proceeds to the outer concentric circle 112 to return to the lamination station 130 for joining to a ply 220. Throughout the entire process, the carrier 210 is tracked via technicians 101 and/or components of rail system 110.

In a similar way, a multilevel track system could also be employed with up to four lamination stations 130 per level of track 118 that moves carriers 210 (which bear plies 220) through outer concentric circle 112, to spur 114, to inner concentric circle 116, to location 410 for placement at a PBP forming station 140. A technician 101 may move the carriers 210 onto the PBP forming station 140 via manual or automated systems from one of the multiple levels one at a time. More than one technician 101 may be working within work space 150 at the same time.

Upon completion of a preform 146, the preform 146 may exit the rail system 110 for hardening into an autoclave dimensioned to the preform 146 or hardening at any suitable processing device. The preform 146 may exit the fabrication system 100 via any suitable direction, such as via travel underneath or above the rail system 110.

In further embodiments, rail system 110 comprises any number of levels of any suitable combination of rails, spurs, and/or concentric or nested portions of track that enable multiple carriers 210 to traverse back and forth from lamination stations 130 to PBP forming stations 140 without interference in a synchronized manner. In such embodiments, the spurs 114 operate as a plurality of modular connection points that facilitate transitioning between concentric portions of track 118, nested portions of track 118, etc.

Illustrative details of the operation of fabrication system 100 will be discussed with regard to FIG. 8. Assume, for this embodiment, that fabrication system 100 is preparing to fabricate multiple preforms 146 at once via PBP forming stations 140.

Figure 8:
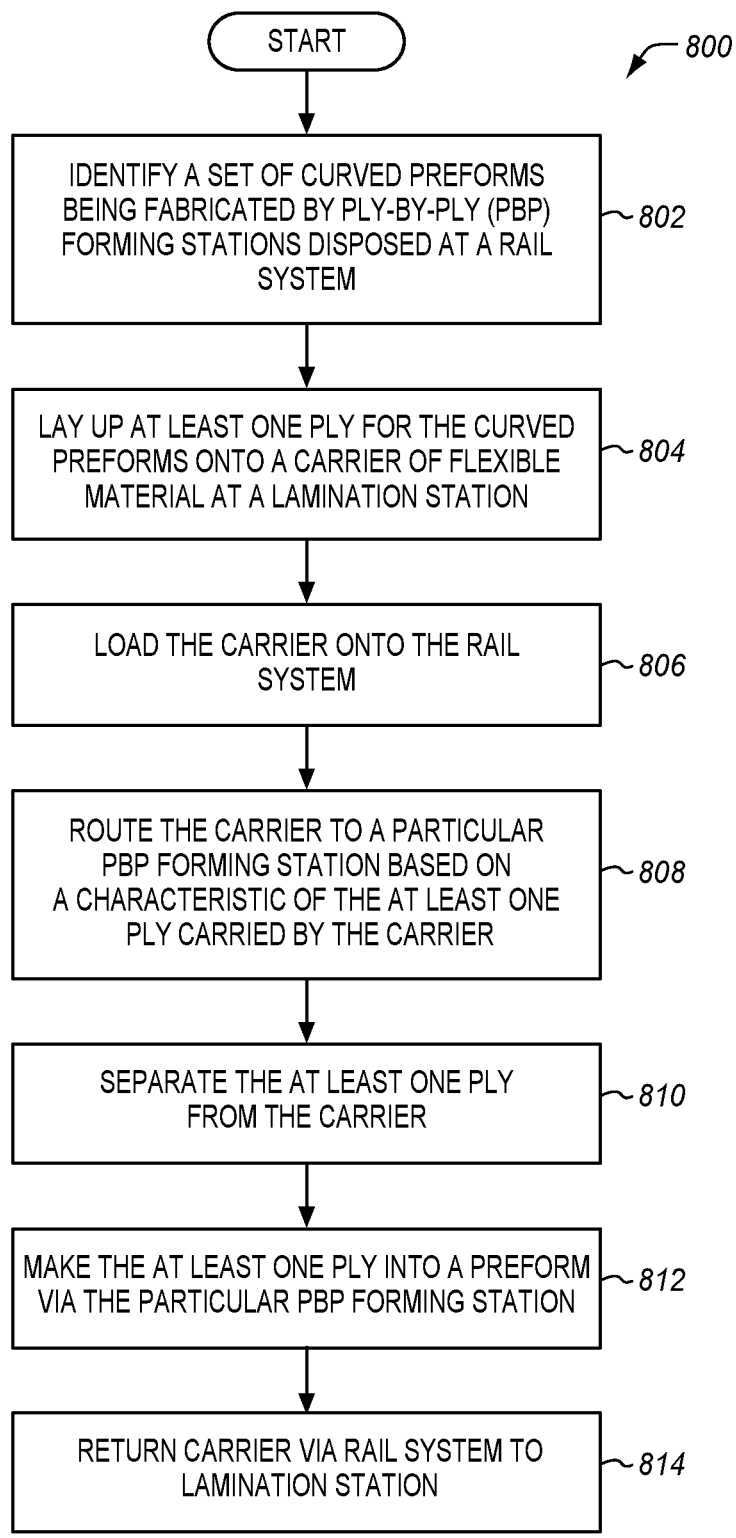
FIG. 8 is a flowchart depicting a method for operating a fabrication system for curved preforms of fiber reinforced material in an illustrative embodiment.

FIG. 8 is a flowchart depicting a method 800 for operating a fabrication system for preforms 146 (e.g., curved preforms) of fiber reinforced material 221 in an illustrative embodiment. The steps of method 800 are described with reference to fabrication system 100 of FIG. 1, but those skilled in the art will appreciate that method 800 may be performed in other systems. The steps of the flowcharts described herein are not all inclusive and may include other steps not shown. The steps described herein may also be performed in an alternative order.

In step 802, one or more lamination stations 130 identify a set of curved preforms being fabricated by PBP forming stations 140, which are disposed at rail system 110. In one embodiment, step 802 comprises operating the lamination stations 130 according to Numerical Control (NC) programs that have been designed to complement NC programs that control the PBP forming stations 140. In a further embodiment, the lamination stations 130 detect progress information from the PBP forming stations 140 or another source and determine which plies 220 are needed next on an ongoing basis. In yet another embodiment, a controller 199 managing the PBP forming stations 140 and the lamination stations 130 selects plies for layup based on a predetermined schedule.

In step 804, a lamination station 130 lays up at least one ply onto carrier 210, which is made of a flexible material. In one embodiment, lamination stations 130 lay up plies 220 for the preforms 146 (e.g., curved preforms) onto carriers 210 at a lamination station 130. Each of the plies 220 is placed in a flat pattern upon the carrier 210 in a configuration that facilitates matching to a desired contour during forming at a PBP forming station 140. In one embodiment, each lamination station 130 lays up a ply 220 (e.g., a single ply) onto a carrier 210, while in further embodiments, the lamination stations 130 lay up multiple plies 220 at a time onto a carrier 210 (e.g., one ply on top of the other. Each ply may have a slightly different flat pattern configuration to facilitate forming to a contour and forming to a contour over multiple plies). In still further embodiments, each of the lamination stations 130 performs lay up onto multiple carriers 210 at once. In yet further embodiments, more or fewer lamination stations 130 and/or PBP forming stations 140 operate at the same time to fabricate a number of preforms 146 equal to the number of PBP forming stations 140 during the same period of time. In one embodiment, he carriers 210 may be horizontally oriented and flat during ply layup. In a further embodiment, the lamination station 130 performs lamination of the ply 220 onto a horizontal orientation or vertical orientation as desired, by placing fiber reinforced material 221 onto a horizontal layup surface or a vertical layup surface, respectively.

The lamination stations 130 may lay up the ply 220 via automated lamination techniques (e.g., automated taping, laying, or fiber placement), via a combination of a composite cutting machine and pick and place techniques, or via any suitable means. In one embodiment, the ply 220 comprises a piece of fiber reinforced material 221 having a desired fiber orientation (e.g., 0°+/−45°,90°), such as a piece of CFRP. In a further embodiment, the ply 220 comprises a fabric of pre-impregnated woven fiber reinforced material, pre-impregnated random fibers, or pre-impregnated discontinuous fibers. The ply 220 may comprise cut pieces of broad goods formed via hand layup techniques, may be fabricated from tows via Automated Tape Layup Machines (ATLMs), Advanced Fiber Placement (AFP) machines, etc. In one embodiment, the lamination stations 130 apply compaction and/or heat that tacks resin at the ply 220 to the carrier 210. This tacks the ply 220 into place at the carrier 210 sufficiently enough to facilitate the flexibility of the combination of ply 220 and carrier 210 as it proceeds through the outer concentric circle 112, spurs 114 and the inner concentric circle 116.

Figure 10A:
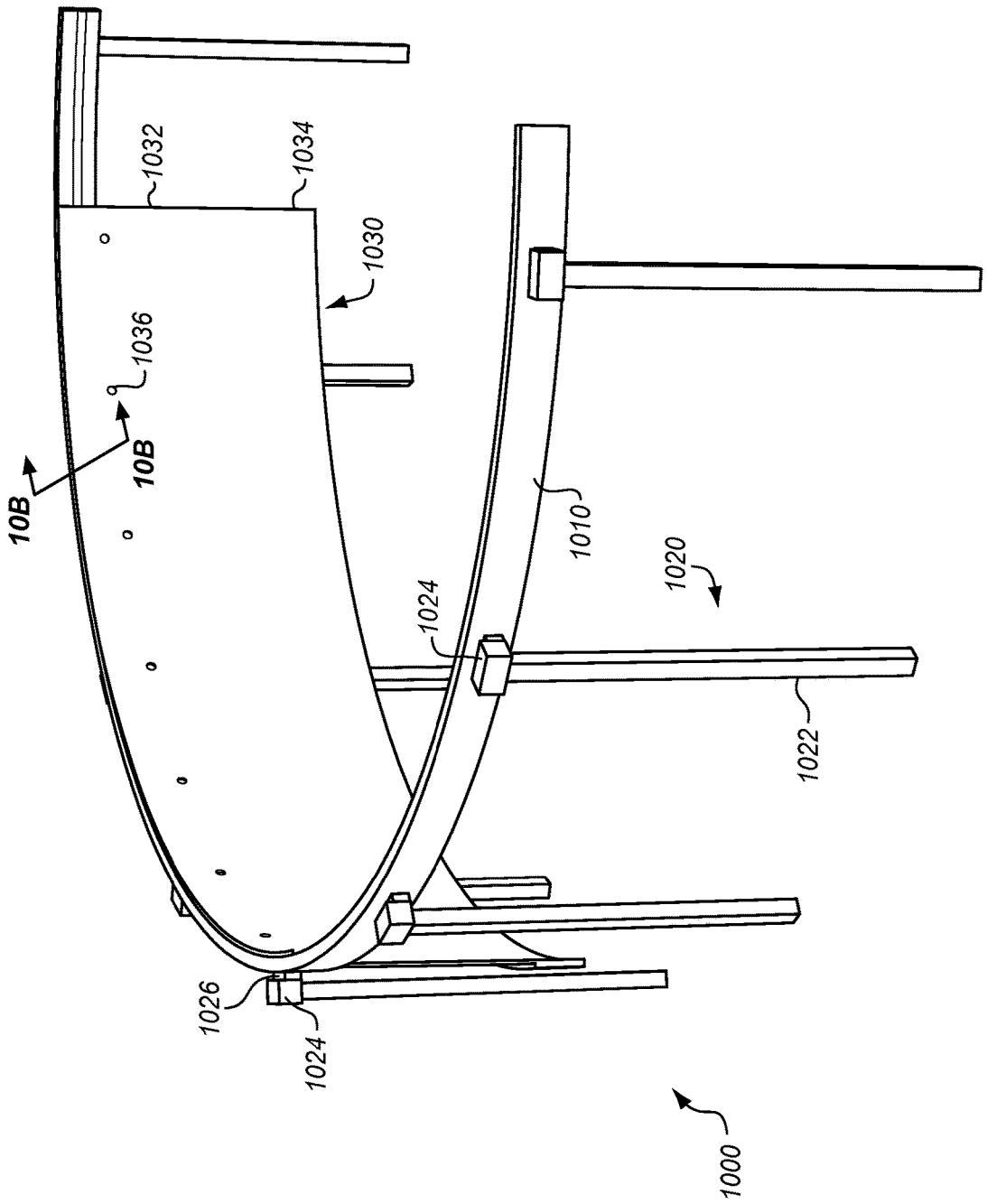
FIG. 10A depicts a carrier traveling along a curved track in an illustrative embodiment.
Figure 12:
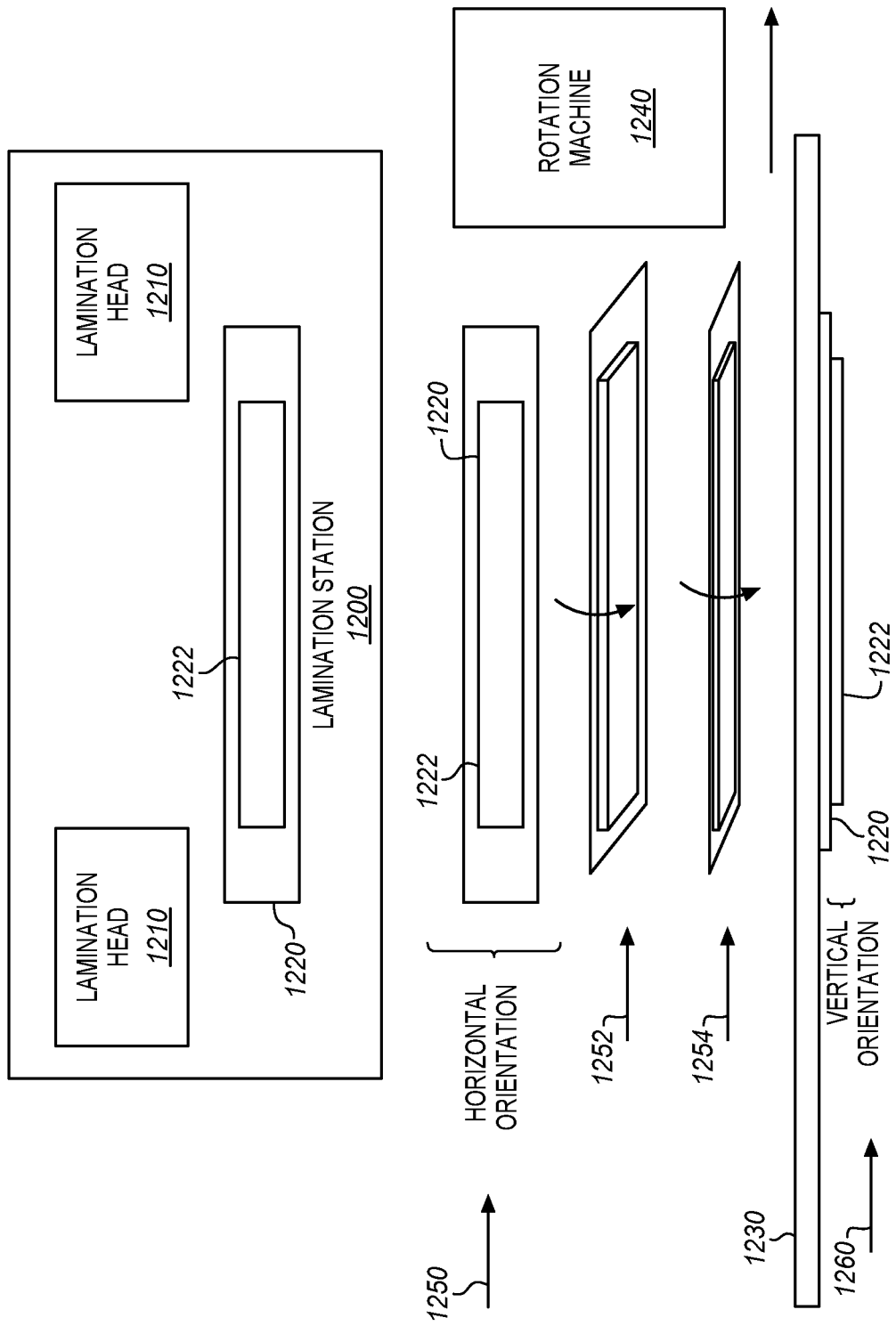
FIG. 12 depicts a carrier and ply rotating from a horizontal orientation to a vertical orientation in an illustrative embodiment.

In step 806, the carrier 210 is loaded onto the rail system 110. In one embodiment, this comprises attaching the carrier 210 to the track 118 of the rail system 110 at an outer concentric circle 112, such that the carrier 210 hangs from the track 118 and is capable of sliding or rolling along the track 118, lengthwise relative to the track 118 (as depicted in FIGS. 10-11). For example, in one embodiment the carrier 210 includes multiple attachment points that are inserted into the track 118 or hung from the track, enabling the carrier 210 to hang from the track 118 as described in FIG. 10A. Furthermore, in step 806, an orientation of the carriers 210 may be altered to accommodate placement onto the track 118. In an embodiment (as depicted in FIG. 12) where the carrier 210 hangs vertically from the track 118, the carrier 210 may have its orientation altered from horizontal to vertical (e.g., by rotating the carrier 210. Thus, in such an embodiment, laying up plies 220 is performed while the carriers 210 are oriented horizontally, and loading the carriers 210 comprises orienting the carriers 210 vertically (as depicted in FIG. 12).

In step 808, the carrier 210 is routed to a particular forming station 140 (e.g., depending on the preform 146 that the at least one ply at the carrier 210 is intended for), based on a characteristic of the at least one ply carried by the carrier 210. In one embodiment, carriers 210 are routed to different ones of the PBP forming stations 140 based on plies 220 carried by the carriers 210. Characteristics of a ply 220 may comprise a flat pattern size, an orientation of fibers of the ply 220, etc. Thus, based on these characteristics, a ply 220 may be suitable for a specific layer of a specific preform being currently fabricated at a specific PBP forming station 140. Thus, based on these characteristics of a ply 220, a carrier 210 may be routed to different PBP forming stations 140.

That is, the carriers 210 are routed to the PBP forming stations 140 which will be utilizing their plies 220. In one embodiment, routing a carrier 210 to a PBP forming station 140 comprises identifying a junction 115 prior to (e.g., adjacent to or disposed upstream of) the PBP forming station 140, advancing the carrier 210 to the junction 115, and switching the carrier 210, at the junction 115, to a track 118 that leads directly to the PBP forming station 140. During routing, a junction 115 just before a desired PBP forming station 140 is used to transition from an outer concentric circle 112 to an inner concentric circle 116, as shown in FIGS. 3A-3B. In one embodiment, routing the carrier 210 to a particular PBP forming station 140 at the rail system 110 based on a characteristic of plies 220 carried by the carriers 210. Characteristics of a ply 220 include a flat pattern size and the orientation of fibers of the ply 220.

Each carrier 210 is routed to a PBP forming station 140 that will utilize a ply 220 carried by that carrier 210 next during the PBP forming process for a preform 146 currently being fabricated by the PBP forming station 140. In one embodiment, routing the carriers 210 comprises bending/deforming/flexing a shape of a carrier 210 as the carrier 210 moves along the rail system 110. Bending/flexing the shape of the carrier 210 facilitates movement of the carrier 210 and ply 220 along the rail system 110 and does not impart a permanent change in shape. The rail system 110, because of its shape and because of the length of the carriers 210, bends the carriers 210 into temporary compliance with the track 118 as the carriers 210 move. In a further embodiment, routing the carriers 210 comprises advancing the carriers 210 through one or more loops (e.g., inner concentric circle 116, outer concentric circle 112) formed by the rail system 110 between the lamination stations 130 and the PBP forming stations 140.

In step 810, the at least one ply is separated from the carrier 210. In one embodiment, plies 220 are applied from the carriers 210 to corresponding ones of the PBP forming stations 140. This comprises transferring the plies 220 to mandrels 142 and/or preforms 146 of the PBP forming stations 140. In one embodiment, this comprises pressing a carrier 210 towards a mandrel 142 until a ply 220 at the carrier 210 comes into contact with and adheres to the mandrel 142 or a preform 146 shaped thereon. In further embodiments, upon application of each ply 220, controller 199 directs a technician to apply a particular ply and/or separate the carrier 210 from the ply 220 (e.g., according to timing information, or feedback from a PBP forming station 140).

The carrier 210 is removed (e.g., peeled) from the ply (or preform), for example by removing the tack between the carrier 210 and the ply 220 such as via mechanical or manual peeling. The carrier 210 is then placed back onto a track 118 of the rail system 110 and moved via the rail system 110 back to a lamination station 130 for re-use, moved to a cleaning station for cleaning, or removed from the rail system 110 entirely.

In step 812, the at least one ply is made into a preform 146 via the particular PBP forming station 140. Once received at the PBP forming station 140, the ply 220 is shaped. That is, after each ply 220 has been transferred to a PBP forming station 140, the PBP forming station 140 forms the ply 220 over an existing preform (or mandrel 142, if the ply 220 is the first ply of the preform). This may be performed while the carrier 210 remains in contact with the ply 220, or after separation of the carrier 210, depending on embodiment. This operation (e.g., a compacting operation) makes the ply 220 integral with the underlying preform 146, if one exists at the PBP forming station 140. The operation also tacks the ply 220 to the preform 146. In some embodiments, upon completion of step 812, further step 814 includes returning the carrier 210 to the lamination stations 130 via the rail system 110. Returning step 814 may be performed via a spur 114 in rail system 110.

Method 800 provides a substantial benefit over prior systems and techniques, because it enables a greater work density than those systems. Multiple lamination stations 130 are concentrated closer to forming stations 140 than before, thereby greatly increasing work density. Specifically, a greater number of PBP forming stations 140 may be placed within close proximity in order to form preforms (e.g., curved preforms 146) for composite parts, and multiple PBP forming stations 140 (e.g., four stations), may be overseen by a single technician, which increases the efficiency of labor. Specifically, a single technician can provide support for automated or semi-automated operation of the PBP forming stations 140, such as by removing carriers 210, performing visual inspection, etc.

Figure 9A:
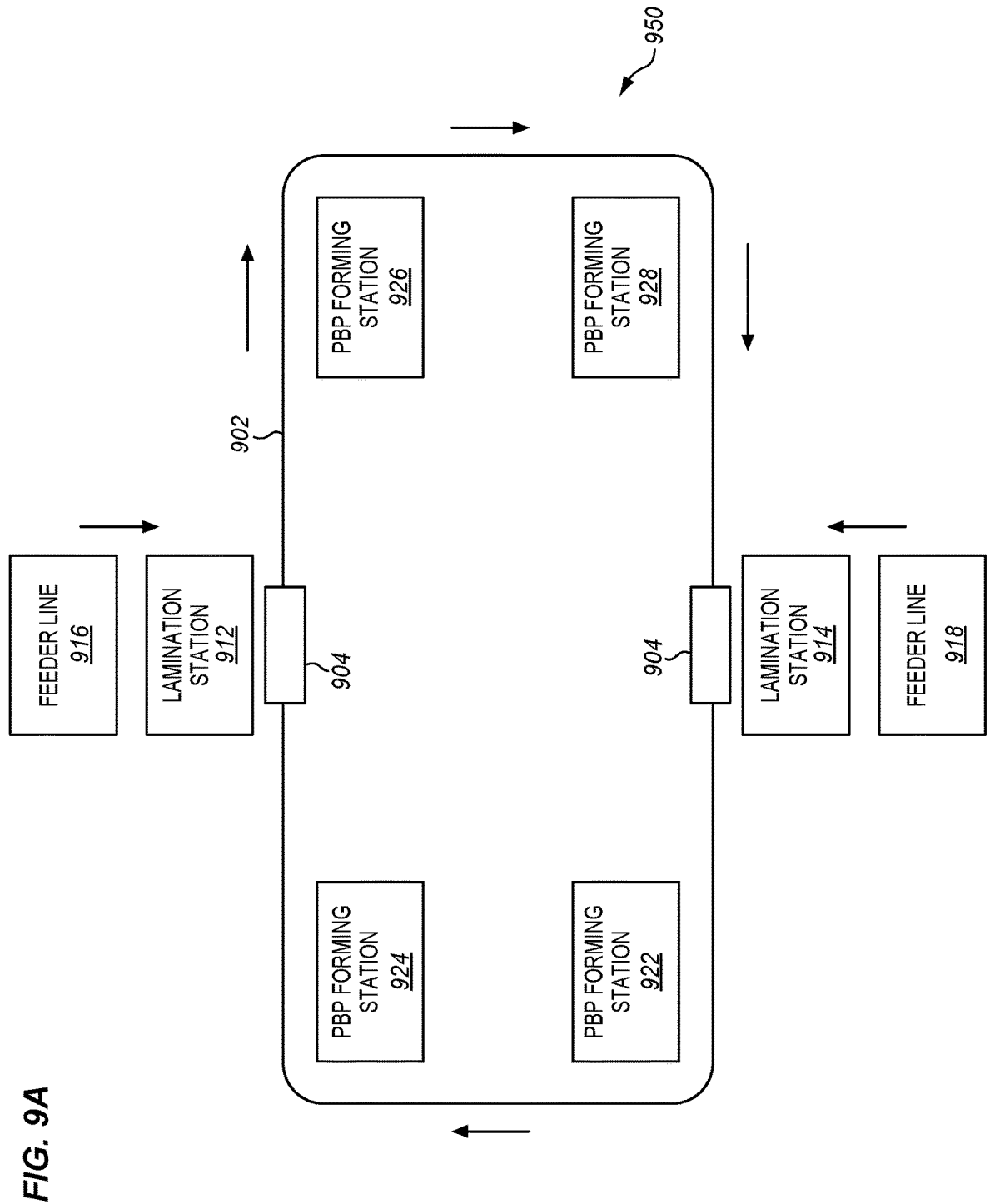
FIG. 9A depicts a further arrangement of lamination stations and PBP forming stations in an illustrative embodiment.

FIG. 9A depicts a further arrangement of lamination stations and PBP forming stations in an illustrative embodiment. In this embodiment, fabrication system 950 includes lamination stations 912 and 914, which lay up plies of fiber reinforced material onto carriers 904 for distribution to PBP forming stations 922, 924, 926, and 928. The lamination station 912 is fed by a feeder line 916 for fiber reinforced material, and the lamination station 914 is fed by a feeder line 918 for fiber reinforced material.

The carriers 904 travel along track 902 in the direction indicated by the arrows, providing plies on an as-needed basis to the PBP forming stations 140. Although two lamination stations and four PBP forming stations are shown, in further embodiments any suitable number of each may be utilized (e.g., four lamination stations and four PBP stations). In a further embodiment, each of the lamination stations 130 is dedicated to layup at a different fiber orientation (e.g., +45°, −45°, 90°, 0°). This may reduce the complexity of the lamination stations 130 while also increasing throughput.

Figure 9B:
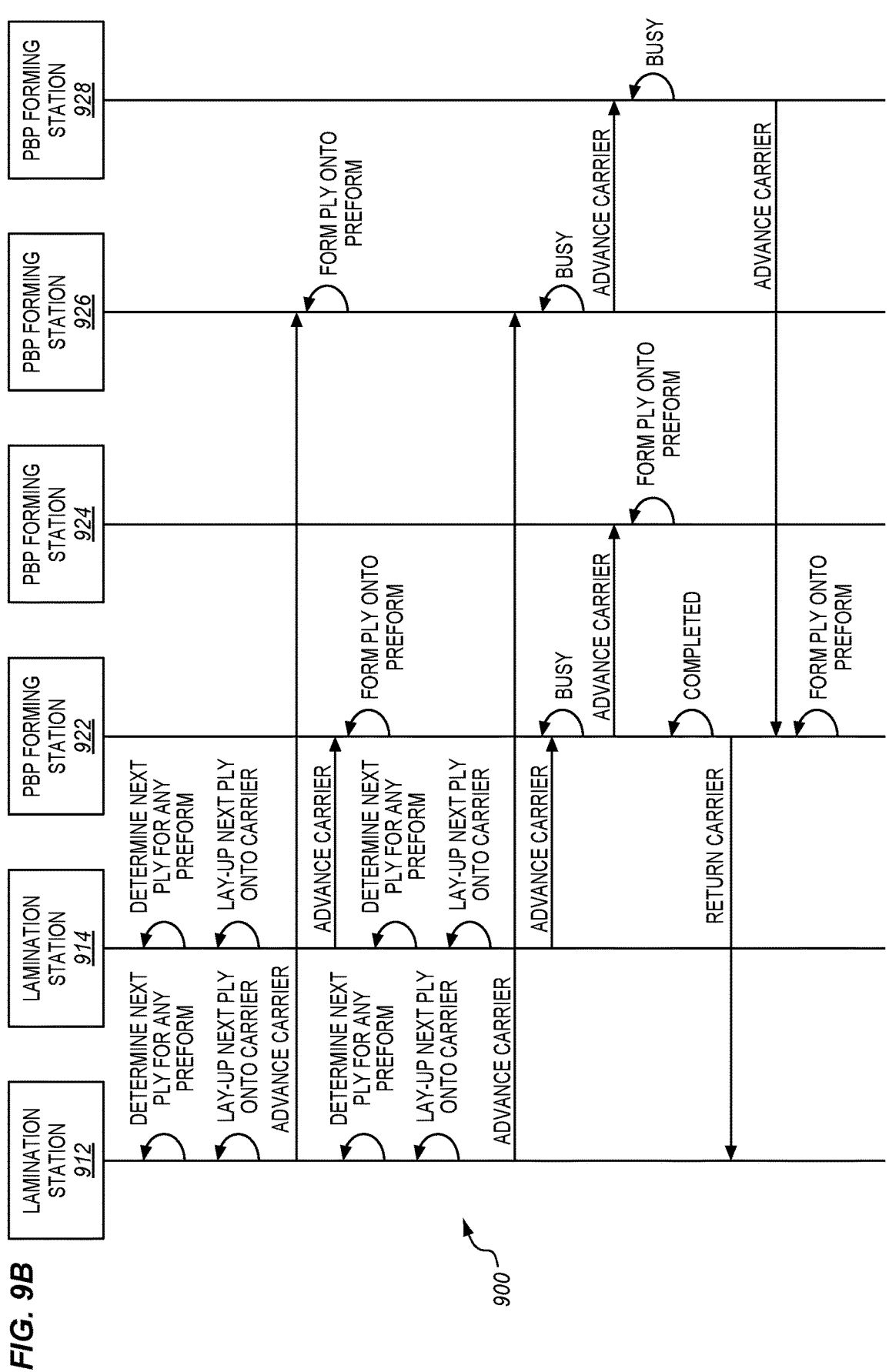
FIG. 9B is a diagram depicting flow of materials through a fabrication system for curved preforms of fiber reinforced material in an illustrative embodiment.

FIG. 9B is a diagram 900 depicting flow of materials through the fabrication system 950 of FIG. 9A for curved preforms of fiber reinforced material in an illustrative embodiment. In FIG. 9B, materials such as plies 220 flow from lamination station 912 and lamination station 914 to PBP forming station 922, PBP forming station 924, PBP forming station 926, and PBP forming station 928. According to diagram 900, lamination station 912 and lamination station 914 determine a next ply for a preform being fabricated at the PBP forming stations 140. In this embodiment, all of the PBP forming stations 140 are at the same stage of fabrication for preforms 146 of the same design. This means that a ply 220 which has been newly created can be supplied to any of the PBP forming stations 140.

The lamination stations 912 and 914 lay up plies of flat pattern onto a carrier 210, and the carriers 210 advance through the PBP forming stations 140. A perimeter configuration of the flat pattern is sized to the particular location the ply will be placed within the preform 146 and the contour designed for that ply 220. Because the lamination stations 912 and 914 are disposed at different locations along a rail system 110, when the carriers 210 are moved along the rail system 110, they reach different PBP forming stations first. Specifically, carriers 210 from lamination station 912 reach PBP forming station 926 first, and while carriers 210 from lamination station 914 reach PBP forming station 922 first, as indicated by the uppermost "advance carrier" arrow from lamination station 912, and the uppermost "advance carrier" arrow from lamination station 914. The plies are then applied to those PBP forming stations 922 and 926.

The lamination stations 912 and 914 prepare additional plies, which are laid-up onto carriers 210 and moved along a rail system 110. In further embodiments, different ones of carriers 904 are disposed at different points of FIG. 9A than each other at a point in time (e.g., at a lamination station, on the track 902, at a PBP forming station 922 or 926 prior to peeling, at a PBP forming station 922 or 926 after peeling.

Upon reaching PBP forming stations 926 and 922, it is determined that the PBP forming stations are busy. Thus, the carriers 210 advance to PBP forming stations 924 and 928, and plies are applied to those PBP forming stations 924 and 928. Upon completion of PBP forming operations for individual plies, corresponding carriers for those plies 220 are peeled from the plies 220 and are returned to the lamination stations 130 via the rail system 110.

With a discussion of overall process flow discussed above, the following figures discuss illustrative implementations of tracks and carriers. FIG. 10A depicts a rail system 1000, wherein a carrier 1030 travels along a track 1010 that is curved in an illustrative embodiment. In this embodiment, supports 1020 hold the track 1010 in an elevated position. The track 1010 may comprise a portion of an inner concentric circle 116, outer concentric circle 112, spur 114, or other portion of a rail system 110. The supports 1020 include posts 1022, which support heads 1024 from which arms 1026 project. The carrier 1030 includes multiple components, including a body 1032 of flexible material, and a band 1034 which is thicker than the body 1032. In this embodiment, the band 1034 weighs more than the body 1032, and helps the carrier 1030 to travel along the track 1010 by ensuring that the carrier 1030 consistently hangs from the track 1010. Attachment elements 1036 are affixed to the carrier 1030 enable slidable or rolling attachment of the carrier 1030 to the track 1010 and may for example comprise wheels or rollers that fit within grooves or projections at the track 1010. In further embodiments, the attachment elements 1036, or the track 1010, include motorized wheels that enable automatic movement of the carrier 1030 as desired. In any case, the attachment elements 1036 slidably travel at the track 118.

The carrier 1030 is affixed to the attachment elements 1036, travels along the track 1010 with the attachment elements 1036, and bends/flexes to match the contoured track while traveling. As the carrier 1030 progresses along the track 1010, the carrier 1030 hangs vertically from the track 1010, and flexes to conform with the contour of the track 1010. This feature is enabled by the flexible nature of the body 1032 of the carrier 1030.

Figure 10B:
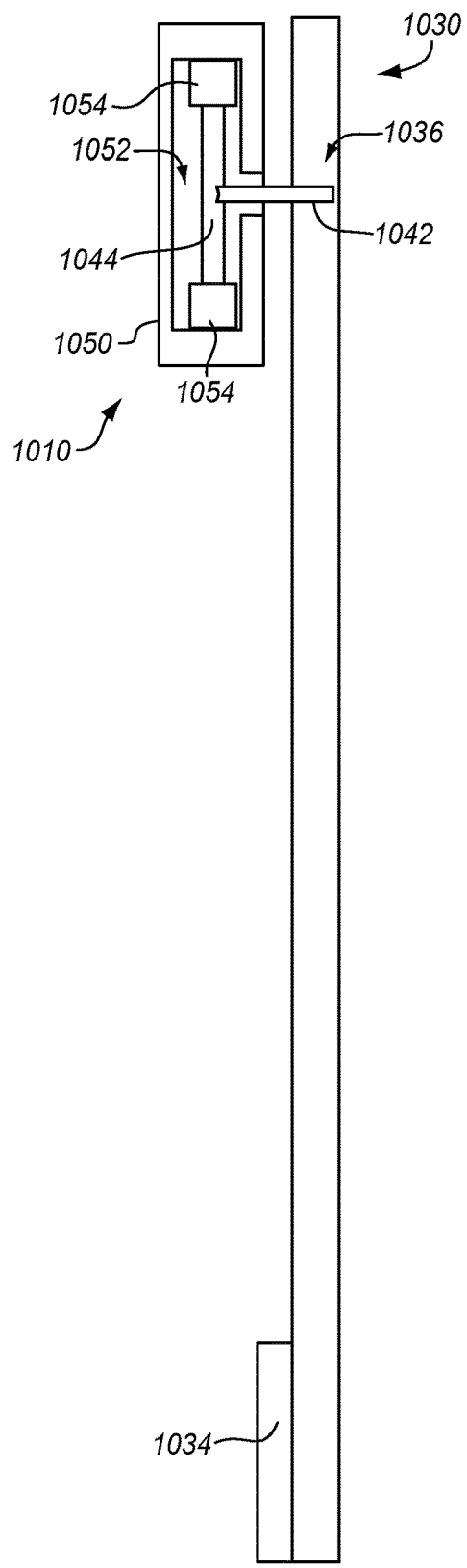
FIG. 10B depicts a coupling of a carrier to a track in an illustrative embodiment.

FIG. 10B depicts a coupling of a carrier to a track in an illustrative embodiment and corresponds with view arrows 10B of FIG. 10A. As shown in FIG. 10B, a retention element 1044, disposed at a rod 1042 of carrier 1030 has been slid into a channel 1052 defined by a body 1050 at track 1010. Thus, the channel 1052 is for receiving a retention element 1044 of each attachment element 1036. The retention element 1044 (e.g., a wheel or a static button) has been inserted from an end of the track 1010, or at a cut-out disposed within the track 1010. The retention element 1044 slides within the channel 1052 as the carrier 1030 proceeds into or out of the page along the track 1010. In further embodiments, rollers 1054 disposed at the track 1010, or at the carrier 1030, drive the retention element 1044 through the track 1010 (e.g., by rotating the rollers or the retention element 1044).

FIG. 11 depicts a carrier 1030 transporting a ply 1100 for application to a PBP forming station in an illustrative embodiment. The ply 1100 is tacked to the carrier 1030 (e.g., via the application of pressure during layup, causing a resin within the ply 1100 to adhere to the surface of the body 1032 in response to applied heat and compaction forces). The ply 1100 itself is also flexible to a limited degree. Thus, as long as a radius (R) of curvature of the track 1010 remains greater than a predetermined limit, the preform 1100 remains adhered to the carrier 1030.

FIG. 12 depicts a carrier 1220 and ply 1222 rotating from a horizontal orientation to a vertical orientation in an illustrative embodiment. This means that FIG. 12 depicts a carrier 1220 at a series of points in time during a transition between orientations, illustrated as a horizontal orientation 1250, orientation 1252, orientation 1254, and a vertical orientation 1260. The rotation facilitates transition of a carrier 1220 from a horizontal orientation 1250 for receiving a layup from lamination heads 1210 at a lamination station 1200, to a vertical orientation 1260 for performing transport at a track 1230. In one embodiment, the lamination station 1200 lays up plies 1222 onto carriers 1220 while the carriers 1220 are in a horizontal orientation 1250, and carrier 1220 are in a vertical orientation 1260 via a rotation machine 1240

(e.g., an end effector or rotary element) after lay up for a ply has been completed. In one embodiment, the rotation machine 1240 may effect a connection of carrier 1220 to track 1230 while in a horizontal orientation 1250 and then allow the carrier 1220 to fall into a vertical orientation 1260.

Figure 12A:
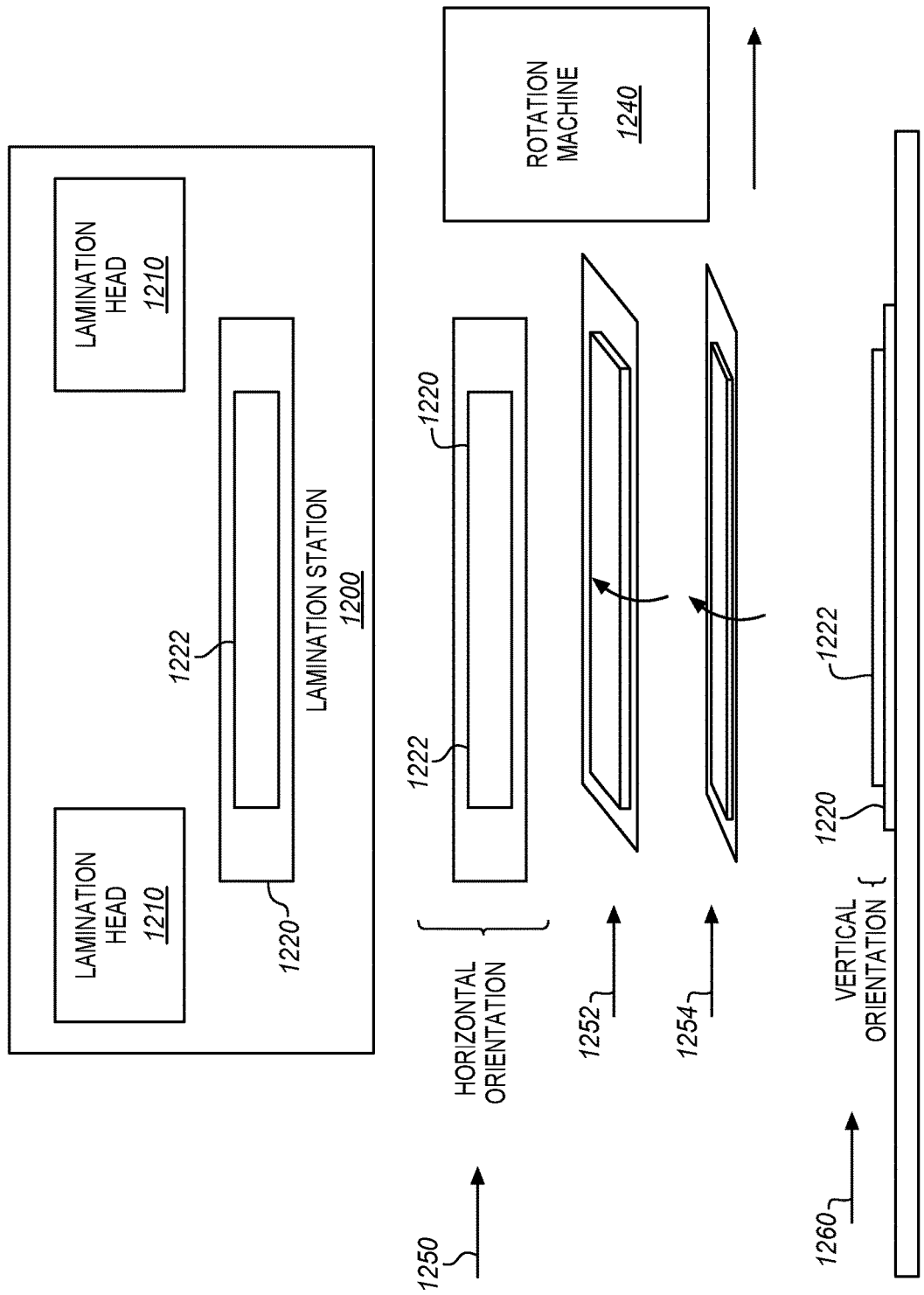
FIG. 12A further depicts a carrier and ply rotating from a horizontal orientation to a vertical orientation in an illustrative embodiment.

FIG. 12A depicts an alternative illustrative embodiment of that shown in FIG. 12, in which carrier 1220 and ply 1222 are rotated from a horizontal orientation to a vertical orientation in a direction opposite that shown in FIG. 12. FIG. 12A depicts a carrier 1220 at a series of points in time during a transition between orientations, illustrated as horizontal orientation 1250, orientation 1252, orientation 1254, and a vertical orientation 1260. In vertical orientation 1260, carrier 1220 and plies 1222 are positioned in an alternative arrangement relative to track 1230, as needed in alternative embodiments of the transportation and presentation of ply 1222 and carrier 1220 at a forming station.

Figure 13:
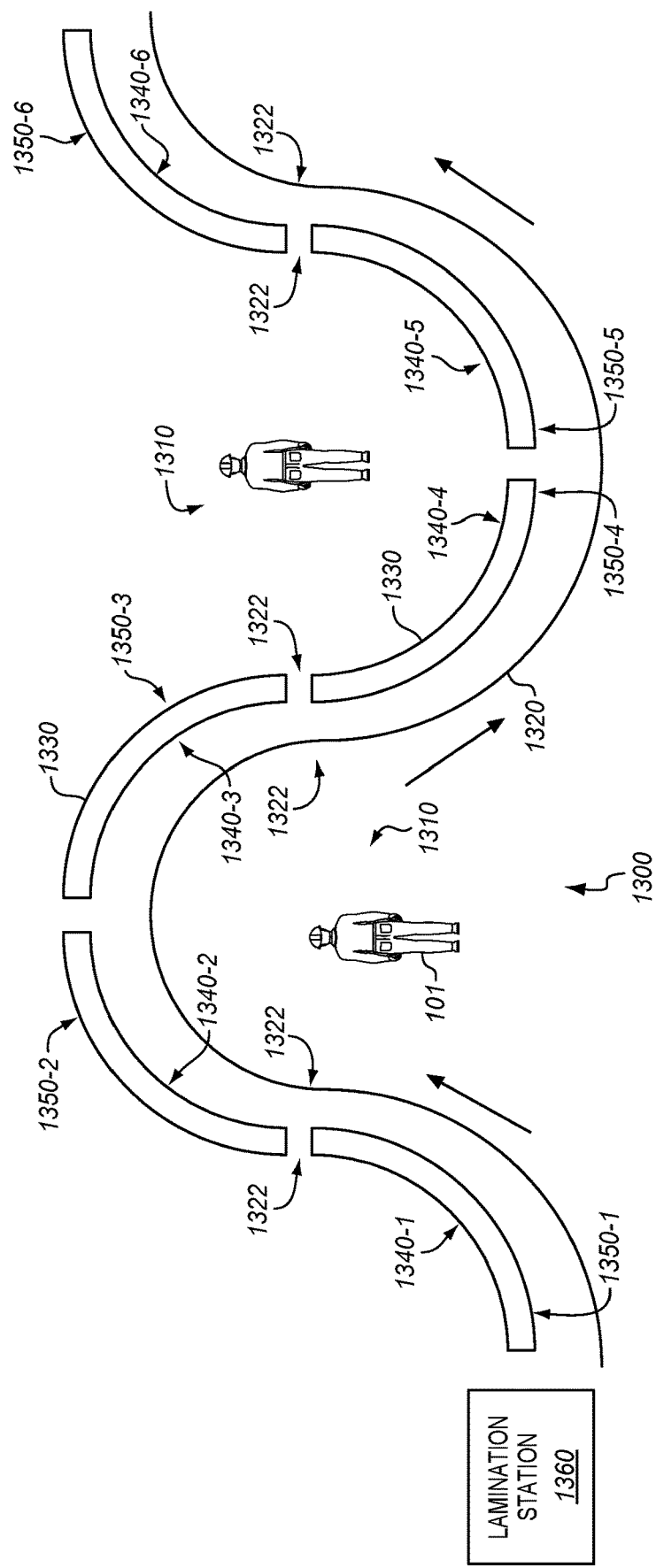
FIG. 13 depicts a further fabrication system for curved preforms in an illustrative embodiment.

FIG. 13 depicts a further fabrication system 1300 for curved preforms in an illustrative embodiment. In this embodiment, the fabrication system 1300 includes a track 1320 that forms a curved "Serpentine" shaped pattern, in which two PBP forming stations 1330 are supervised by technician 101 at a work space 1310. The PBP forming stations 1330 are arranged at different orientations such that after each point of inflection 1322 of the track 1320. The inner mold line (EVIL) surfaces 1340-1 through 1340-6 change from facing downwards relative to the page to upwards (or vice versa) to accommodate the work spaces 1310. The outer mold line (OML) surfaces, 1350-1 through 1350-6, change from facing upwards relative to the page to downwards (or vice versa). This arrangement enables a single lamination station 1360 to service multiple PBP forming stations 1330 at once.

Figure 14:
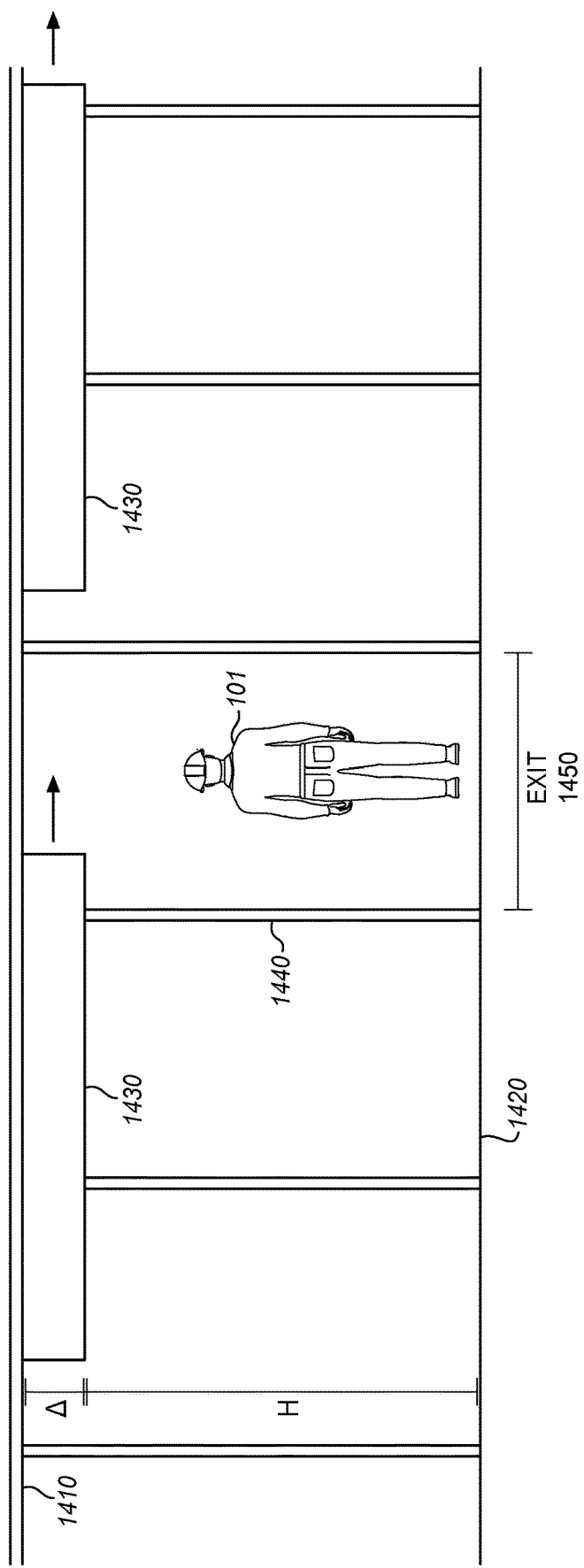
FIG. 14 depicts an elevated rail that enables a technician to pass under it in an illustrative embodiment.

FIG. 14 depicts an elevated rail 1410 that enables a technician 101 to pass under it in an illustrative embodiment and corresponds with view arrows 14 of FIG. 1. Specifically, the elevated rail 1410, which is held in position by supports 1440, is held such that carriers 1430 are elevated at a height H from a factory floor 1420. Depending on embodiment, H may be set at the top of a range of expected maximum heights of workers (e.g., seven feet, eight feet, etc.), set to the height of a ceiling (e.g., eight or ten feet), etc. The spacing of the support 1440, together with the height H, form an exit 1450 for a technician 101 to safely leave a work space. In a further embodiment, the height H plus a carrier width (A) adds to the height range. This enables a technician 101 to exit without the exit 1450 being partially obscured by a carrier 1430. In further embodiments, the technician 101 utilizes an elevated work stand or other component to perform work in a work space, and then leaves the work stand to egress the work space and thereby passing under the elevated rail 1410.

Figure 15:
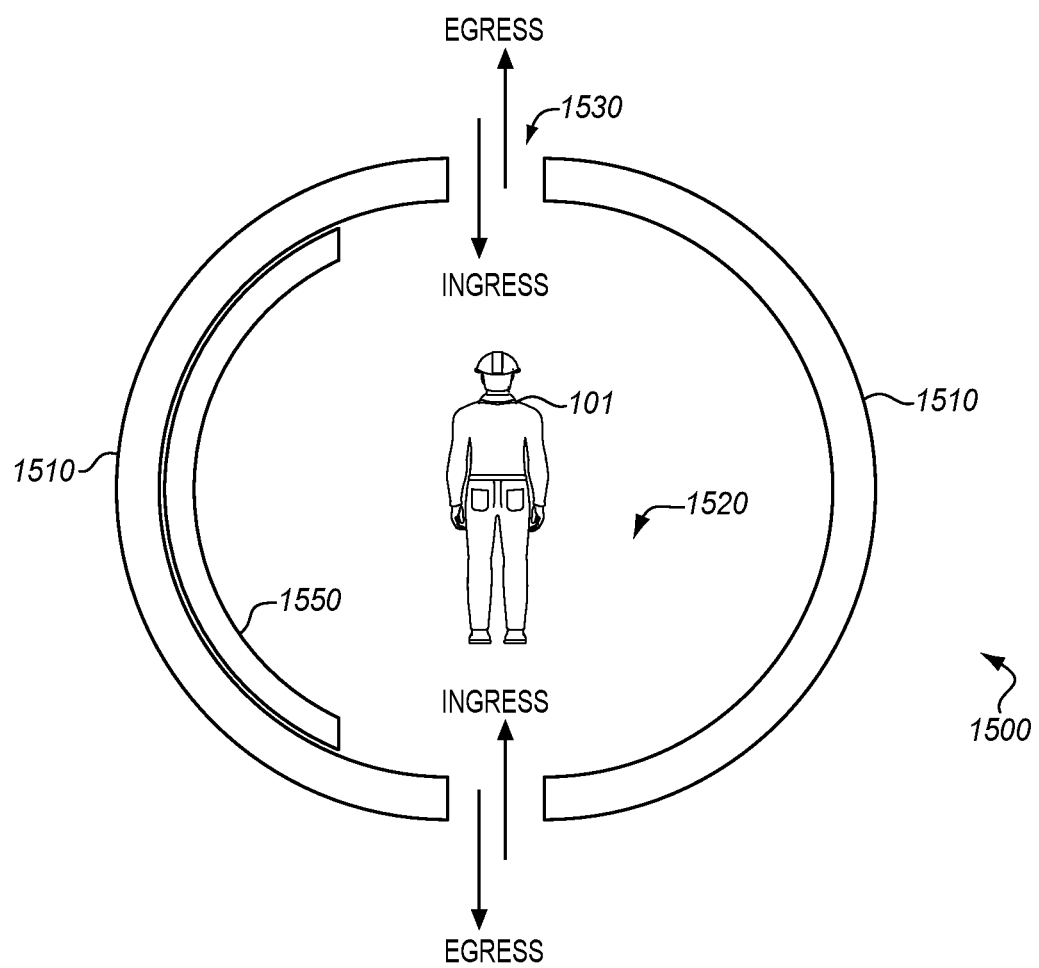
FIG. 15 depicts a technician at a fabrication system that includes PBP forming stations for semicircular preforms in an illustrative embodiment.

FIG. 15 depicts a technician 101 at a fabrication system 1500 that includes PBP forming stations 1510 for semicircular preforms 1550 in an illustrative embodiment. The PBP forming stations 1510 form half-circles in this embodiment. However, in further embodiments the PBP forming stations 1510 may form any suitable arcuate portions. In this embodiment, the PBP forming stations 1510 surround a work space 1520, in which a technician 101 is disposed. The technician 101 may perform ingress and/or egress into the work space 1520 via access pathways 1530. Note that a rail system is omitted in FIG. 15 for the sake of simplicity and clarity. However, the rail system may be elevated to enable the technician 101 to pass beneath it, or the technician 101 may be provided with a means of elevating over the rail system to egress above it. In still further embodiments, a portion of the rail system is hinged to enable pass through egress and ingress.

In the following examples, additional processes, systems, and methods are described in the context of a fabrication system for curved composite parts.

Figure 16:
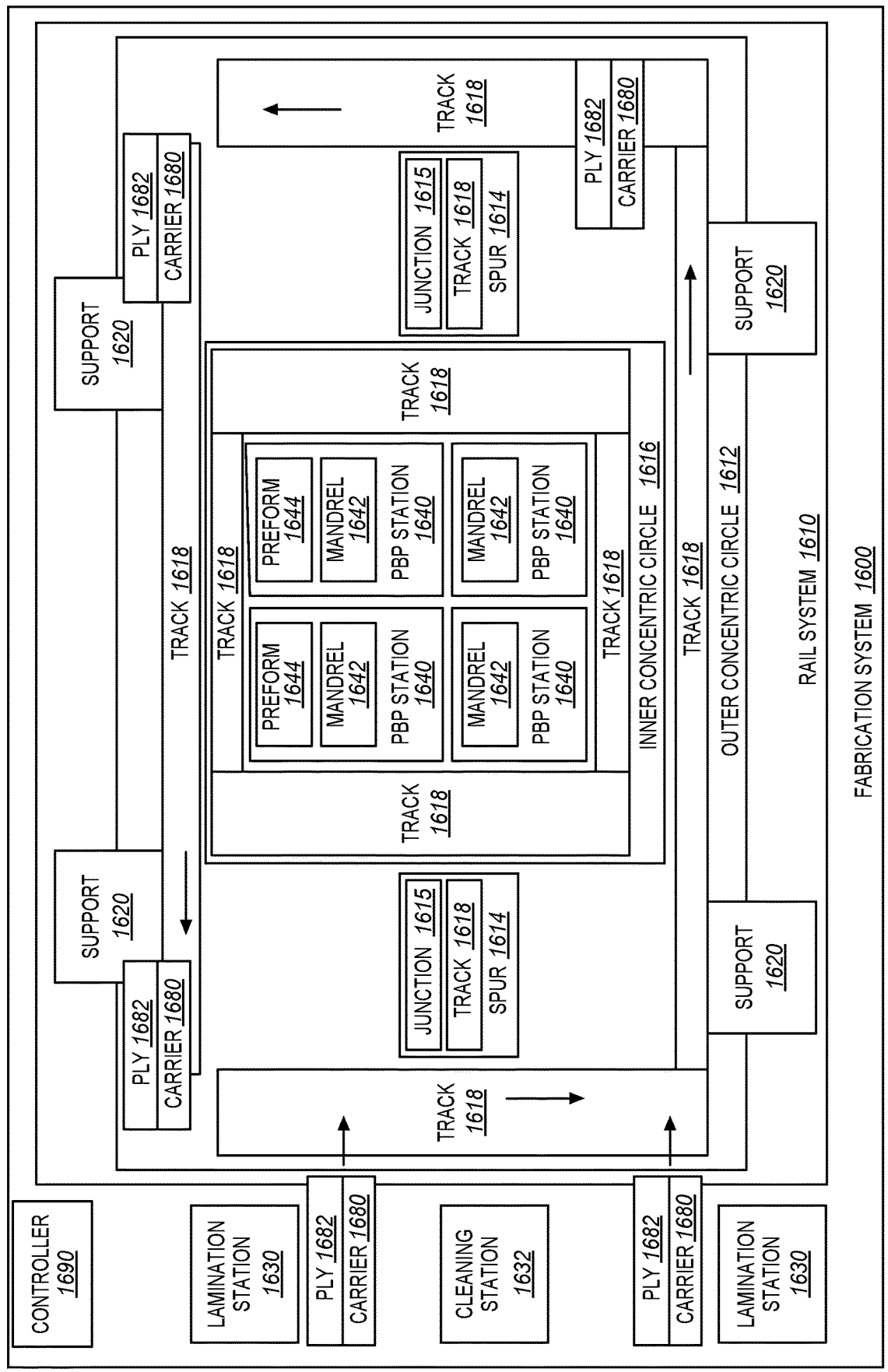
FIG. 16 is a block diagram of a fabrication system for a curved preform in an illustrative embodiment.

FIG. 16 is a block diagram of a fabrication system 1600 for a curved preform in an illustrative embodiment. In this embodiment, fabrication system 1600 includes rail system 1610, which includes an outer concentric circle 1612 and an inner concentric circle 1616 of track 1618. Tracks 1618 are held in place by supports 1620, and spurs 1614 include junctions 1615 that couple the track 1618 in the inner concentric circle 1616 to track 1618 in the outer concentric circle 1612. Lamination stations 1630 lay up plies 1682 of fiber reinforced material onto carriers 1680, although in further embodiments only one lamination station 1630 is utilized to service the entire fabrication system. Carriers 1680 holding plies 1682 travel through the rail system 1610 and reach PBP stations 1640. If the PBP stations 1640 already have preforms 1644, then the plies 1682 are applied to the preforms 1644. Alternatively, the plies are applied directly to the mandrels 1642 of PBP stations 1640. The carriers 1680 may return to cleaning station 1632 for cleaning and residue removal, for repair, and/or for replacement before advancing back to lamination stations 1630.

FIG. 16 further depicts a controller 1690 that controls operations of the rail system 1610, lamination stations 1630, and/or PBP stations 1640 in accordance with sensor input, NC programs, a timed schedule and/or other factors. In one embodiment, controller 1690 is implemented as custom circuitry, as a hardware processor executing programmed instructions stored in memory, or some combination thereof.

Figure 17:
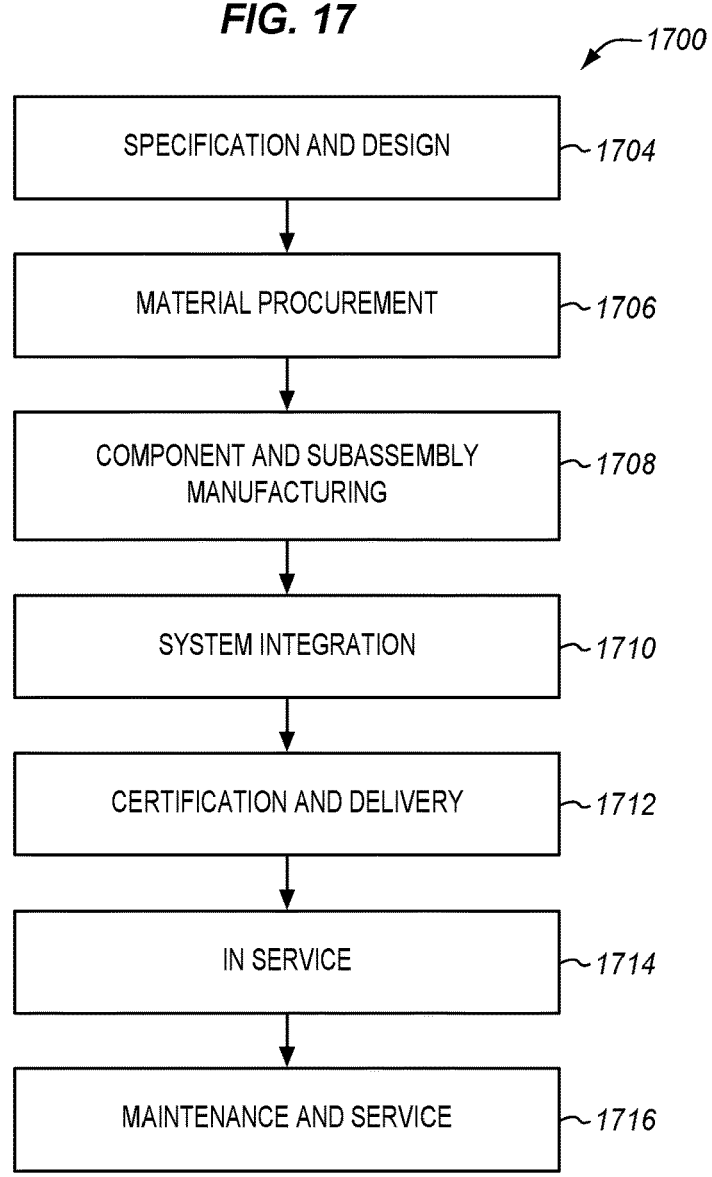
FIG. 17 is a flow diagram of aircraft production and service methodology in an illustrative embodiment.
Figure 18:
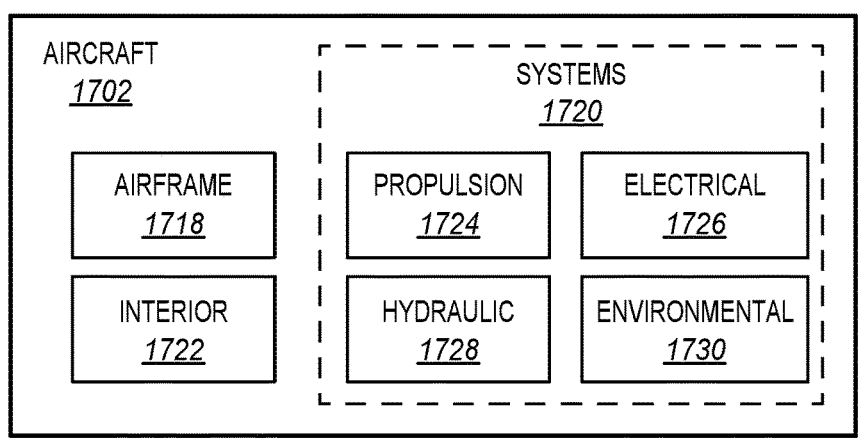
FIG. 18 is a block diagram of an aircraft in an illustrative embodiment.

Referring more particularly to the drawings, embodiments of the disclosure may be described in the context of aircraft manufacturing and service in method 1700 as shown in FIG. 17 and an aircraft 1702 as shown in FIG. 18. During pre-production, method 1700 may include specification and design 1704 of the aircraft 1702 and material procurement 1706. During production, component and subassembly manufacturing 1708 and system integration 1710 of the aircraft 1702 takes place. Thereafter, the aircraft 1702 may go through certification and delivery 1712 in order to be placed in service 1714. While in service by a customer, the aircraft 1702 is scheduled for routine work in maintenance and service 1716 (which may also include modification, reconfiguration, refurbishment, and so on). Apparatus and methods embodied herein may be employed during any one or more suitable stages of the production and service described in method 1700 (e.g., specification and design 1704, material procurement 1706, component and subassembly manufacturing 1708, system integration 1710, certification and delivery 1712, service 1714, maintenance and service 1716) and/or any suitable component of aircraft 1702 (e.g., airframe 1718, systems 1720, interior 1722, propulsion system 1724, electrical system 1726, hydraulic system 1728, environmental 1730).

Each of the processes of method 1700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 18, the aircraft 1702 produced by method 1700 may include an airframe 1718 with a plurality of systems 1720 and an interior 1722. Examples of systems 1720 include one or more of a propulsion system 1724, an electrical system 1726, a hydraulic system 1728, and an environmental system 1730. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1700. For example, components or subassemblies corresponding to component and subassembly manufacturing 1708 may be fabricated or manufactured in a manner similar to components or subassemblies produced while the aircraft 1702 is in service. Also, one or more apparatus embodiments, method embodiments, or a combination thereof may be utilized during the subassembly manufacturing 1708 and system integration 1710, for example, by substantially expediting assembly of or reducing the cost of an aircraft 1702. Similarly, one or more of apparatus embodiments, method embodiments, or a combination thereof may be utilized while the aircraft 1702 is in service, for example and without limitation during the maintenance and service 1716. Thus, the invention may be used in any stages discussed herein, or any combination thereof, such as specification and design 1704, material procurement 1706, component and subassembly manufacturing 1708, system integration 1710, certification and delivery 1712, service 1714, maintenance and service 1716 and/or any suitable component of aircraft 1702 (e.g., airframe 1718, systems 1720, interior 1722, propulsion system 1724, electrical system 1726, hydraulic system 1728, and/or environmental 1730).

In one embodiment, a part comprises a portion of airframe 1718 and is manufactured during component and subassembly manufacturing 1708. The part may then be assembled into an aircraft in system integration 1710, and then be utilized in service 1714 until wear renders the part unusable. Then, in maintenance and service 1716, the part may be discarded and replaced with a newly manufactured part. Inventive components and methods may be utilized throughout component and subassembly manufacturing 1708 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for fabricating a curved preform of fiber reinforced material, the method comprising:
   laying up at least two plies onto a carrier of flexible material at a lamination station;
   loading the carrier onto a rail system;
   routing the carrier to a particular Ply-By-Ply (PBP) forming station at the rail system based on a characteristic of one of the at least two plies carried by the carrier;
   separating the one ply from the carrier;
   making the one ply into the curved preform via the particular PBP forming station; and
   routing the carrier to different ones of PBP forming stations at the rail system based on the characteristic of another one of the at least two plies carried by the carrier.

2. The method of claim 1, further comprising:
   identifying the curved preform being fabricated by the particular PBP forming station.

3. The method of claim 2, wherein:
   laying up the at least two plies comprises laying up the ply for the curved preform.

4. The method of claim 1, wherein:
   a characteristic of the ply is selected from the group consisting of: a flat pattern size and an orientation of fibers of the ply.

5. The method of claim 1, wherein:
   separating the ply from the carrier is performed by a technician.

6. The method of claim 1, wherein:
   laying up the ply is performed while the carrier is oriented horizontally, and
   loading the carrier comprises orienting the carrier vertically.

7. The method of claim 1, wherein:
   routing the carrier to the particular PBP forming station comprises identifying a junction adjacent to the particular PBP forming station, advancing the carrier to the junction, and switching the carrier, at the junction, to a track that leads directly to the particular PBP forming station.

8. The method of claim 1, wherein:
   routing the carrier comprises flexing a shape of the carrier and the at least two plies as the carrier moves along the rail system.

9. The method of claim 1, wherein:
   routing the carrier comprises advancing the carrier through a spur in the rail system.

10. The method of claim 1, wherein:
    making the ply into the curved preform comprises compacting the ply into a corresponding preform by operating the PBP forming stations.

11. The method of claim 10, wherein:
compacting the ply comprises forming a first ply for a preform onto mandrel.

12. The method of claim 1, further comprising:
returning the carrier via the rail system to the lamination station.

13. The method of claim 12, wherein:
returning the carrier is performed via a spur of the rail system.

14. A method for fabricating a curved preform of fiber reinforced material, the method comprising:
laying up at least two plies onto a carrier of flexible material at a lamination station;
loading the carrier onto a rail system;
routing the carrier to a particular Ply-By-Ply (PBP) forming station at the rail system based on a characteristic of one of the at least two plies carried by the carrier;
separating the ply from the carrier;
making the ply into the curved preform via the particular PBP forming station; and
routing the carrier to different ones of PBP forming stations at the rail system based on the characteristic of another one of the at least two plies carried by the carrier,
wherein:
laying up the at least two plies is performed while the carrier is oriented horizontally, and
loading the carrier comprises orienting the carrier vertically, and
wherein:
routing the carrier to the particular PBP forming station comprises identifying a junction adjacent to the particular PBP forming station, advancing the carrier to the junction, and switching the carrier, at the junction, to a track that leads directly to the particular PBP forming station.

15. The method of claim 14, further comprising:
identifying the curved preform being fabricated by the particular PBP forming station.

16. The method of claim 15, wherein:
laying up the at least two plies comprises laying up the ply for the curved preform.

17. The method of claim 14, wherein:
a characteristic of the ply is selected from the group consisting of: a flat pattern size and an orientation of fibers of the ply.

18. The method of claim 14, wherein:
separating the ply from the carrier is performed by a technician.

19. The method of claim 14, wherein:
routing the carrier comprises flexing a shape of the carrier and the at least two plies as the carrier moves along the rail system.

20. The method of claim 14, wherein:
routing the carrier comprises advancing the carrier through a spur in the rail system.

21. The method of claim 14, wherein:
making the ply into the curved preform comprises compacting the ply into a corresponding preform by operating the PBP forming stations.

22. The method of claim 21, wherein:
compacting the ply comprises forming a first ply for a preform onto mandrel.

23. The method of claim 14, further comprising:
returning the carrier via the rail system to the lamination station.

24. The method of claim 23, wherein:
returning the carrier is performed via a spur of the rail system.

* * * * *